United States Patent
Feng

(10) Patent No.: US 10,624,115 B2
(45) Date of Patent: Apr. 14, 2020

(54) RADIO RESOURCE SCHEDULING METHOD, DEVICE AND SYSTEM

(71) Applicant: GUANGDONG OPPO MOBILE TELECOMMUNICATIONS CORP., LTD., Dongguan, Guangdong (CN)

(72) Inventor: Bin Feng, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 15/739,885

(22) PCT Filed: Dec. 1, 2015

(86) PCT No.: PCT/CN2015/096139
§ 371 (c)(1),
(2) Date: Dec. 26, 2017

(87) PCT Pub. No.: WO2017/091980
PCT Pub. Date: Jun. 8, 2017

(65) Prior Publication Data
US 2018/0199364 A1    Jul. 12, 2018

(51) Int. Cl.
*H04W 72/12* (2009.01)
*H04W 72/04* (2009.01)
(Continued)

(52) U.S. Cl.
CPC ......... *H04W 72/1278* (2013.01); *H04W 4/46* (2018.02); *H04W 72/02* (2013.01);
(Continued)

(58) Field of Classification Search
None
See application file for complete search history.

(56) References Cited

U.S. PATENT DOCUMENTS

| 2003/0045995 A1 | 3/2003 | Lee |
| 2009/0154379 A1 | 6/2009 | Hayashi |

(Continued)

FOREIGN PATENT DOCUMENTS

| CN | 101636933 A | 1/2010 |
| CN | 103108396 A | 5/2013 |

(Continued)

OTHER PUBLICATIONS

International Search Report in international application No. PCT/CN2015/096139, dated Aug. 24, 2016.
(Continued)

*Primary Examiner* — Michael J Moore, Jr.
(74) *Attorney, Agent, or Firm* — Ladas & Parry LLP; Hermine Valizadeh

(57) ABSTRACT

A radio resource scheduling method, device and system are provided. The method includes that: a first-type terminal device determines whether to send resource scheduling request information to a base station and/or a second-type terminal device, wherein the first-type terminal device communicates with the base station through a first-type interface, the first-type terminal device communicates with the second-type terminal device through a second-type interface, the second-type terminal device communicates with the base station through the first-type interface, and the second-type terminal device has a resource scheduling function; and the first type-terminal device determines link resources configured for communication with other first-type terminal device according to a result of the determination. In such a manner, at least one of the base station or the second-type terminal device may perform scheduling for the first-type terminal device.

16 Claims, 21 Drawing Sheets

(51) Int. Cl.
*H04W 4/46* (2018.01)
*H04W 76/14* (2018.01)
*H04W 72/02* (2009.01)
*H04W 88/04* (2009.01)

(52) U.S. Cl.
CPC .......... *H04W 72/04* (2013.01); *H04W 76/14* (2018.02); *H04W 88/04* (2013.01)

(56) References Cited

U.S. PATENT DOCUMENTS

| | | | |
|---|---|---|---|
| 2009/0161644 | A1 | 6/2009 | Suzuki |
| 2009/0296680 | A1 | 12/2009 | Suzuki |
| 2015/0195827 | A1 | 7/2015 | Feng |
| 2016/0242144 | A1* | 8/2016 | Adachi .................. H04W 4/90 |
| 2017/0086081 | A1* | 3/2017 | Kim ...................... H04W 4/046 |
| 2017/0150490 | A1* | 5/2017 | Chen .................... H04B 1/3822 |
| 2017/0303272 | A1* | 10/2017 | Li ......................... H04W 72/04 |
| 2018/0176750 | A1* | 6/2018 | Xu ......................... H04L 29/08 |
| 2018/0227726 | A1* | 8/2018 | Futaki .................... H04W 4/02 |
| 2018/0234898 | A1* | 8/2018 | Kahtava ................ H04W 16/14 |
| 2018/0242190 | A1* | 8/2018 | Khoryaev ......... H04W 28/0284 |
| 2018/0255558 | A1* | 9/2018 | Lee ....................... H04W 72/10 |
| 2018/0262887 | A1* | 9/2018 | Futaki .................. H04W 48/20 |
| 2018/0263052 | A1* | 9/2018 | Xu ........................ H04W 72/04 |
| 2018/0317221 | A1* | 11/2018 | Yasukawa ............... H04W 4/04 |
| 2018/0359619 | A1* | 12/2018 | Ma ........................ H04W 84/18 |

FOREIGN PATENT DOCUMENTS

| | | |
|---|---|---|
| CN | 104080176 A | 10/2014 |
| CN | 104902572 A | 9/2015 |
| CN | 104954976 A | 9/2015 |
| GB | 2496836 A | 5/2013 |
| JP | 2009159098 A | 7/2009 |
| JP | 2017515431 A | 6/2017 |
| WO | 2014012244 A1 | 1/2014 |
| WO | 2014048486 A1 | 4/2014 |
| WO | 2014173429 A1 | 10/2014 |
| WO | 2015046155 A1 | 4/2015 |
| WO | 2015141167 A1 | 9/2015 |
| WO | 2015143170 A1 | 9/2015 |

OTHER PUBLICATIONS

The Written Opinion of the International Search Authority in international application No. PCT/CN2015/096139, dated Aug. 24, 2016.

3rd Generation Partnership Project;Technical Specification Group Radio Access Network;Evolved Universal Terrestrial Radio Access (E-UTRA);Medium Access Control (MAC) protocol specification(Release 12) mailed in Sep. 2015.

3rd Generation Partnership Project;Technical Specification Group Radio Access Network;Evolved Universal Terrestrial Radio Access (E-UTRA);Physical layer procedures(Release 12) mailed in Sep. 2015.

English Translation of the Written Opinion of the International Search Authority in international application No. PCT/CN2015/096139, dated Aug. 24, 2016.

Supplementary European Search Report in European application No. 15909497.8, dated Nov. 28, 2018.

Mitsubishi Electric: "UE and e-NB Type RSU Architectures for V2X Communications", 3GPP Draft; R3-152640-(ARCHFORV2X), 3rd Generation Partnership Project (3GPP), Mobile Competence Centre; 650, Route Deslucioles; F-06921 Sophia-Antipolis Cedex; France vol. RAN WG3, No. Anaheim, CA (USA); Nov. 16, 2015-Nov. 20, 2015 Nov. 16, 2015 (Nov. 16, 2015), XP05I007510, Retrieved from the Internet: URL:http://www.3gpp.org/ftp/Meetings_3GPP_SYNC/RAN3/Docs/ [retrieved on Nov. 16, 2015]* paragraph 2.2, Figure 2.

Nokia Networks: "Considerations of V2X implications to RAN operation",3GPP Draft; R2-154147-V2X, 3rd Generationpartnership Project (3GPP), Mobilecompetence Centre ; 650, Route Deslucioles ; F-06921 Sophia-Antipolis Cedex; France, vol. RAN WG2, No. Malmo, Sweden; 20151005-201510094 Oct. 2015 (Oct. 4, 2015), XP051004741, Retrieved from the Internet: URL:http://www.3gpp.org/ftp/Meetings3GPPSYNC/RAN2/Docs/ —[retrieved on Oct. 4, 2015]* paragraph 2.2 ** table 1 *.

Sony: "PC5 enhancements on resource allocation for V2V Services", 3GPP Draft; RI-156709 PC5 Enhancements on Resource Allocation for V2V Services, 3rd Generation Partnership Project (3GPP), Mobile Competence Centre ; 650, Route Deslucioles ; F-06921 Sophia-Antipolis, vol. RAN WG1, No. Anaheim, USA; 20151115-2015112215 Nov. 2015 (Nov. 15, 2015), XP051003093, Retrieved from the Internet: URL:http://www.3gpp.org/ftp/RAN1/Docs, Whole Document.

"3rd Generation Partnership Project; Technical Specification Group Radio Access Network; Study on LTE-based V2X Services; (Release 14)" 3GPP Standard; 3GPP TR 36.885 3rd Generation Partnership Project (3GPP) Mobile Competence Centre ; 650 Route Deslucioles ; F-06921 Sophia-Antipolis Cedex; France vol. RAN WG1 No. V0.3.0 Nov. 27, 2015 (Nov. 27, 2015) pp. 1-59 XP051046295 [retrieved on Nov. 27, 2015]* paragraph 4.3 ** paragraph 5.1.1 * * figures 4-3 and 4-4 *.

First Office Action of JP application No. 2018-502389, dated Jul. 5, 2019.

Kyocera; "Resource allocation schemes for D2D communication", [online], 3GPP TSG-RAN WG 2 #84 R2-134311, Nov. 5, 2013.

* cited by examiner

100

| A first-type terminal device determines whether to send resource scheduling request information to a base station and/or second-type terminal device or not, wherein the first-type terminal device communicates with the base station through a first-type interface, the first-type terminal device communicates with the second-type terminal device through a second-type interface, the second-type terminal device communicates with the base station through the first-type interface, and the second-type terminal device has a resource scheduling function | ~ S110 |

| The first type-terminal device determines link resources configured for communication with other first-type terminal device according to a determined result | ~ S120 |

A second-type terminal device receives resource scheduling request information sent by a first-type terminal device, wherein the second-type terminal device communicates with a base station through a first-type interface, the first-type terminal device communicates with the base station through the first-type interface, and the second-type terminal device communicates with the first-type terminal device through a second-type interface  ～ S310

The second-type terminal device sends resource grant information to the first-type terminal device for the first-type terminal device to determine link resources configured for communication with other first-type terminal device according to the resource grant information  ～ S320

FIG. 8

400
A base station sends cell-level resource pool information to a first-type terminal device and a second-type terminal device, wherein the base station communicates with the first-type terminal device through a first-type interface, the base station communicates with the second-type terminal device through the first-type interface, and the first-type terminal device communicates with the second-type terminal device through a second-type interface ~ S410

The base station receives a resource scheduling request sent by the first-type terminal device ~ S420

The base station sends resource grant information to the first-type terminal device according to the resource scheduling request for the first-type terminal device to determine link resources configured for communication with other first-type terminal device according to the resource grant information ~ S430

FIG. 12

RADIO RESOURCE SCHEDULING METHOD, DEVICE AND SYSTEM

RELATED APPLICATION

This application is an application under 35 U.S.C. 371 of International Application No. PCT/CN2015/096139 filed on Dec. 1, 2015, the entire contents of which are incorporated herein by reference.

TECHNICAL FIELD

Embodiments of the disclosure relate to the field of mobile communications, and more particularly to a radio resource scheduling method, device and system.

BACKGROUND

The Internet of vehicles has become a hot field for development of wireless communication technologies, wherein Vehicle-to-Everything (V2X) communication (including Vehicle-to-Vehicle (V2V) communication, Vehicle to Infrastructure (V2I) communication and Vehicle-to-Pedestrian (V2P) communication) is a technology with the greatest impact on a wireless transmission technology in the field of the Internet of vehicles, and V2V communication is a core of the V2X communication technology. V2V may share sensing information of an on-board radar, a camera and the like (i.e. sensor sharing) between vehicles through wireless communication between the vehicles to extend sensing ranges of the vehicles from a sight distance range of tens of meters to a non-sight distance range of hundreds of meters, thereby greatly improving driving safety of the vehicles and effectively implementing aided driving and automatic driving.

However, a V2V communication system is a complicated wireless communication system confronted with many technical challenges, and one of the technical challenges is that: it is required that it supports hundreds of vehicles to simultaneously send sensor sharing information within a range of hundreds of meters, and meanwhile, it is required that a low delay and high data transmission reliability is maintained. Therefore, usage of a V2V resource scheduling technology capable of effectively suppressing interference between terminals is required.

An existing V2V technology, i.e. Institute of Electrical and Electronic Engineers (IEEE) 802.11p, may merely adopt a pure Ad-Hoc networking and scheduling manner for lack of cooperation of a cellular network. However, such a scheduling manner is relatively lower in efficiency, and along with increase of a number of terminals, a V2V communication delay may gradually be increased, and a transmission success rate may gradually be reduced.

A Long Term Evolution (LTE)-based V2X technology under research and standardization of the 3rd-Generation Partnership Project (3GPP) is expected to achieve V2V transmission performance higher than the IEEE 802.11p, this is because it may perform centralized scheduling on V2V terminals by virtue of a base station of an LTE cellular network to greatly improve V2V transmission efficiency, reduce a V2V transmission delay and increase a transmission success rate.

Such a scheduling technology combining base station centralized scheduling and Ad Hoc scheduling has been adopted in an LTE Device-to-Device (D2DD) standard, and thus an existing LTE V2X technical solution mainly references the LTE D2DD design. An LTE V2V system is formed by an LTE network and On Board Units (OBUs). FIG. 1 is a deployment scenario of an existing V2V system.

In a scenario in coverage of an LTE base station (called as an In Coverage scenario), the base station firstly assigns Sidelink resources to an OBU terminal for V2V transmission, and then the OBU terminal uses the resources assigned by the base station to transmit Sidelink data and transmission parameters thereof.

If the coverage of the LTE base station is unstable, there are no signals sometimes (called as a Partial coverage scenario) and the base station cannot dynamically assign the Sidelink resources to the terminal in real time, the base station periodically broadcasts information of a semi-static resource pool, and as long as the OBU terminal receives the information of the resource pool when being in coverage, Sidelink resources may be randomly selected from the resource pool to send V2V data and transmission parameters thereof when the terminal is out of coverage.

In a scenario completely out of the coverage of the LTE base station (called as an Out of Coverage scenario), it is even impossible for the OBU terminal to occasionally receive the information of the resource pool in a broadcast message of the base station. Under such a condition, Sidelink resources may only be randomly selected from a preconfigured resource pool statically stored in the terminal to send the V2V data and the transmission parameters thereof.

However, randomly selecting the Sidelink resources from the resource pool to send the V2V data and the transmission parameter thereof may inevitably cause a resource conflict and interference between OBU terminals to reduce a transmission success rate of the V2V data. If multiple retransmissions are performed to increase the transmission success rate, a transmission delay may be increased. For achieving both a high success rate and a low delay, the number of vehicles simultaneously sending V2V signals within the same coverage must be limited, which makes it difficult to implement V2V communication of a large vehicle flow.

Therefore, for reducing interference between OBU terminals and improving V2V communication efficiency, it is necessary to increase a proportion of the In Coverage scenario and reduce a proportion of the Out of Coverage scenario as much as possible. Base station coverage and capacity of a telecommunication operator are planned according to a density distribution of terminals of a conventional type (for example, mobile phones), and it is difficult to ensure good coverage for the OBU terminals. More seriously, if the telecommunication operator is unwilling to perform base station upgrading and network optimization to support a V2V service in consideration of a cost problem, the OBU terminals may completely be located in the Out of Coverage scenario, and at this moment, the LTE V2V technology can only adopt random selection from a resource pool or "listen before talk" adopted by the IEEE 802.11p, and its performance is unlikely to be better than the IEEE 802.11p.

SUMMARY

The disclosure provides a radio resource scheduling method, device and system, which may increase a success rate of V2V communication, reduce a transmission delay and expand a communication capacity of a V2V system.

A first aspect provides a radio resource scheduling method, which may include that: a first-type terminal device determines whether to send resource scheduling request information to a base station and/or a second-type terminal device, wherein the first-type terminal device may communicate with the base station through a first-type interface, the first-type terminal device may communicate with the second-type terminal device through a second-type interface, the second-type terminal device may communicate with the base station through the first-type interface, and the second-type terminal device may have a resource scheduling function; and the first type-terminal device determines link resources configured for communication with other first-type terminal device according to a result of the determination.

A second aspect provides a radio resource scheduling method, which may include that: a second-type terminal device receives resource scheduling request information sent by a first-type terminal device, wherein the second-type terminal device may communicate with a base station through a first-type interface, the first-type terminal device may communicate with the base station through the first-type interface, and the second-type terminal device may communicate with the first-type terminal device through a second-type interface; and the second-type terminal device sends resource grant information to the first-type terminal device for the first-type terminal device to determine link resources configured for communication with other first-type terminal device according to the resource grant information.

A third aspect provides a radio resource scheduling method, which may include that: a base station sends cell-level resource pool information to a first-type terminal device and a second-type terminal device, wherein the base station may communicate with the first-type terminal device through a first-type interface, the base station may communicate with the second-type terminal device through the first-type interface, and the first-type terminal device may communicate with the second-type terminal device through a second-type interface; the base station receives a resource scheduling request sent by the first-type terminal device; and the base station sends resource grant information to the first-type terminal device according to the resource scheduling request for the first-type terminal device to determine link resources configured for communication with other first-type terminal device according to the resource grant information.

A fourth aspect provides a device, which may include: a resource configuration module, configured to determine whether to send resource scheduling request information to a base station and/or a second-type terminal device, wherein the device may communicate with the base station through a first-type interface, the device may communicate with the second-type terminal device through a second-type interface, the second-type terminal device may communicate with the base station through the first-type interface, and the second-type terminal device may have a resource scheduling function; and the resource configuration module may further be configured to determine link resources configured for communication with another device according to a result of the determination.

A fifth aspect provides a device, which may include: a receiving module, configured to receive resource scheduling request information sent by a first-type terminal device, wherein the device may communicate with a base station through a first-type interface, the first-type terminal device may communicate with the base station through the first-type interface, and the device may communicate with the first-type terminal device through a second-type interface; and a sending module, configured to send resource grant information to the first-type terminal device for the first-type terminal device to determine link resources configured for communication with other first-type terminal device according to the resource grant information.

A sixth aspect provides a device, which may include: a sending module, configured to send cell-level resource pool information to a first-type terminal device and a second-type terminal device, wherein the device may communicate with the first-type terminal device through a first-type interface, the device may communicate with the second-type terminal device through the first-type interface, and the first-type terminal device may communicate with the second-type terminal device through a second-type interface; a receiving module, configured to receive a resource scheduling request sent by the first-type terminal device; and a resource scheduling module, configured to determine resource grant information according to the resource scheduling request, the sending module being further configured to send the resource grant information to the first-type terminal device for the first-type terminal device to determine link resources configured for communication with other first-type terminal device according to the resource grant information.

A seventh aspect provides a radio resource scheduling system, which may include: the device of the fourth aspect, the device of the fifth aspect and the device of the sixth aspect.

On the basis of the abovementioned technical characteristics of the embodiments of the disclosure, the first-type terminal device may select to send the resource scheduling request to at least one of the base station or the second-type terminal device with the resource scheduling function. Then, at least one of the base station or the second-type terminal device may perform scheduling for the first-type terminal device. Therefore, interference between terminals may be avoided, a transmission success rate may be increased, a transmission delay may be reduced, performance and reliability of a V2V system may be ensured, and a communication capacity of the V2V system may be expanded.

BRIEF DESCRIPTION OF DRAWINGS

In order to describe the technical solutions of the embodiments of the disclosure more clearly, the drawings required to be used for the embodiments of the disclosure will be simply introduced below. Obviously, the drawings described below are only some embodiments of the disclosure. For those skilled in the art, other drawings may further be obtained according to these drawings without creative work.

FIG. 4 is a schematic flowchart of a radio resource scheduling method according to an embodiment of the disclosure.

FIG. 8 is a schematic flowchart of a radio resource scheduling method according to another embodiment of the disclosure.

FIG. 12 is a schematic flowchart of a radio resource scheduling method according to another embodiment of the disclosure.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those skilled in the art on the basis of the embodiments in the disclosure without creative work shall fall within the scope of protection of the disclosure.

Figure 1:
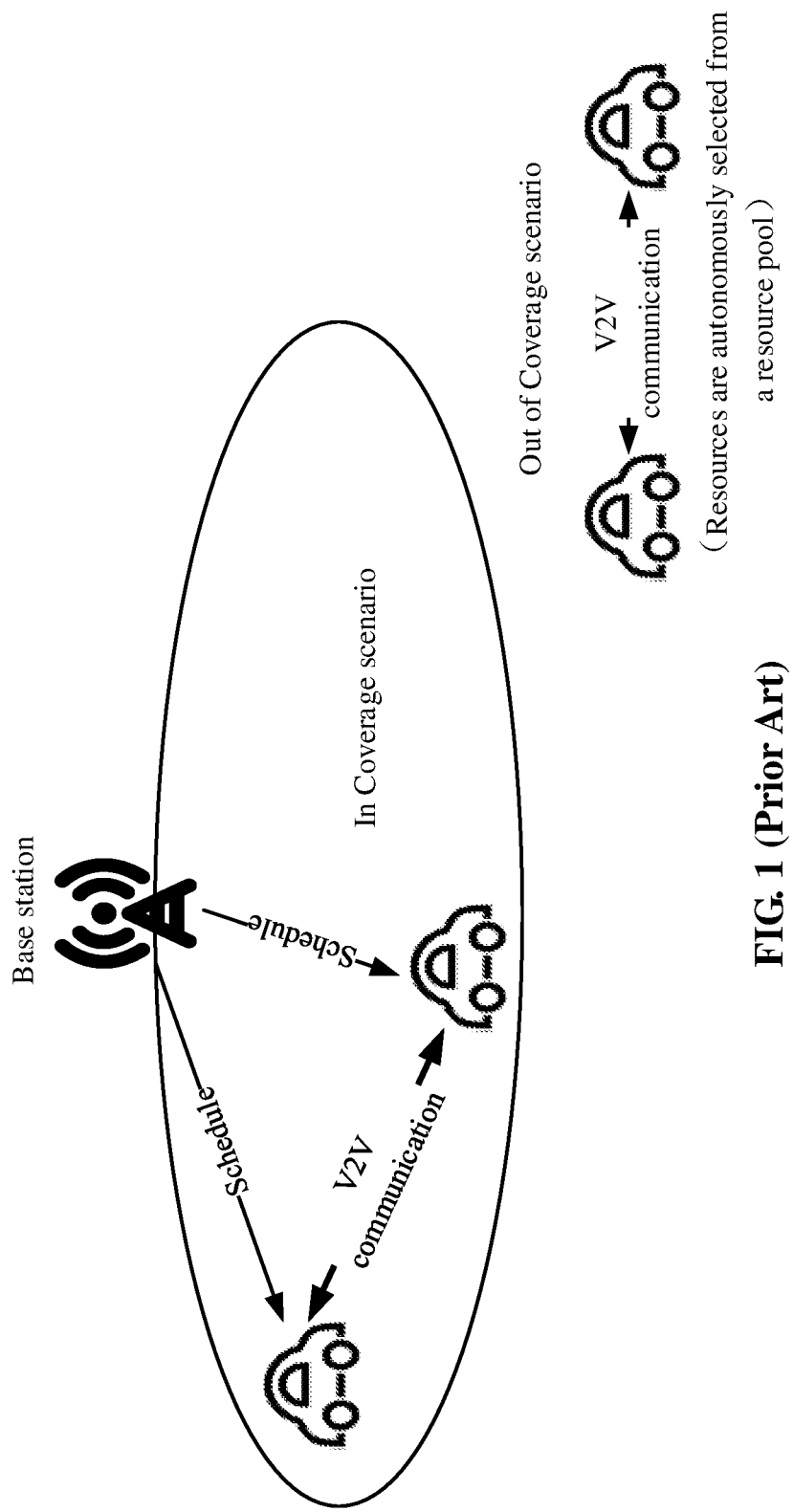
FIG. 1 is a schematic diagram of a deployment scenario of an LTE V2V system according to a conventional art.
Figure 2:
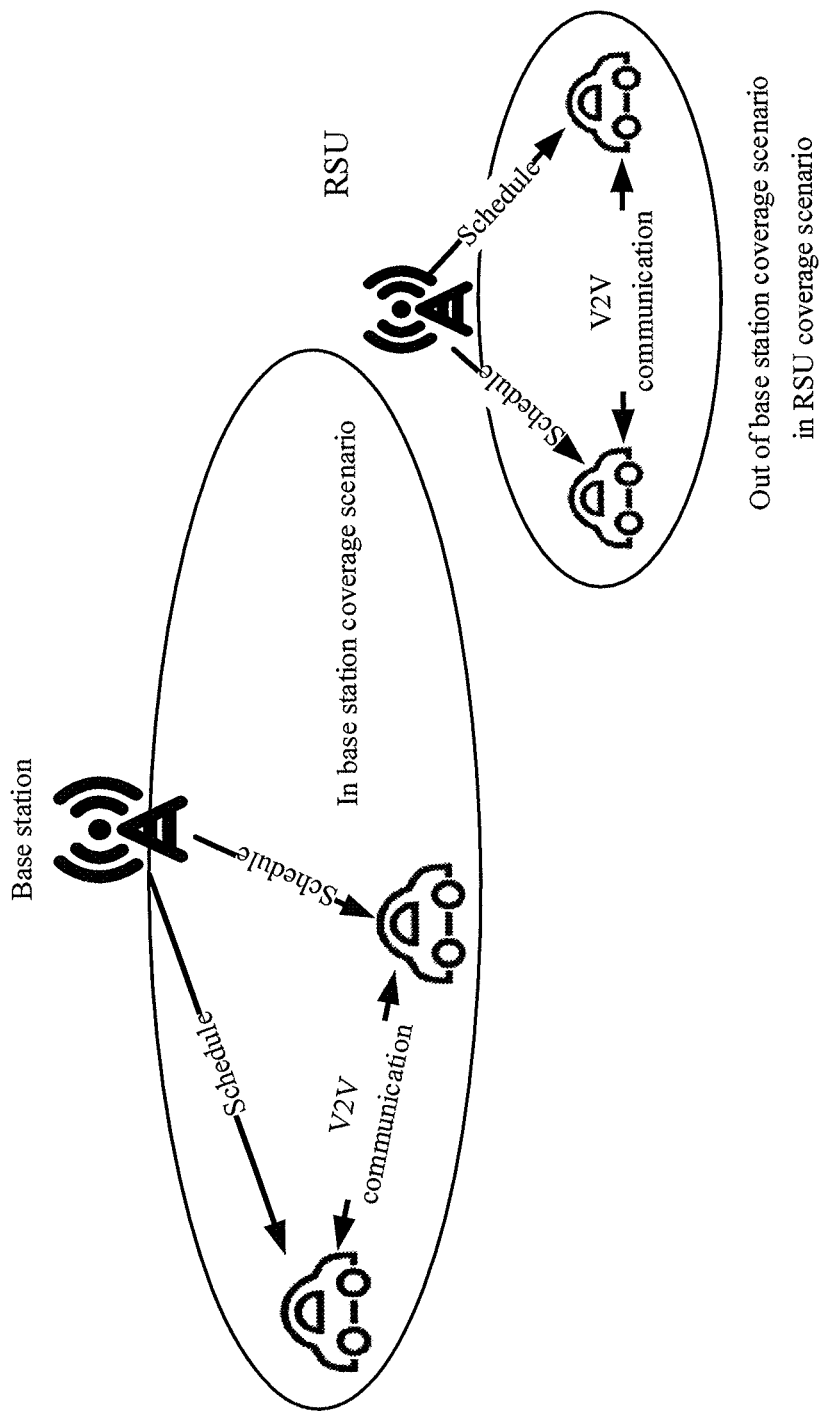
FIG. 2 is a schematic diagram of a deployment scenario of an LTE V2V system according to an embodiment of the disclosure.

FIG. 2 is a schematic diagram of a deployment scenario of an LTE V2V system according to an embodiment of the disclosure. In FIG. 2, an OBU may communicate with a Road Side Unit (RSU). Optionally, the RSU is a device with a V2X terminal function, for example, an intelligent traffic light and a traffic sign, and may provide intelligent traffic information for the OBU to improve traffic efficiency of a vehicle mounted with the OBU. RSUs are always mounted on road sides, may form good coverage for vehicles to compensate coverage blind zones of mobile base stations, require no backhaul networks, are independent of telecommunication operating companies, and may be densely deployed with low cost by the traffic control department.

In the embodiment of the disclosure, the RSU further has an OBU scheduling function, besides a function of receiving and sending V2X signals and a function of scheduling by a base station, and may convert a manner of randomly selecting a Sidelink resource from a static/semi-static resource pool into a Sidelink resource scheduling manner instead of the base station when an OBU terminal is located in an Out of Coverage scenario, and equivalently, the Out of Coverage scenario of the base station is converted into an In Coverage scenario of the RSU.

Figure 3:
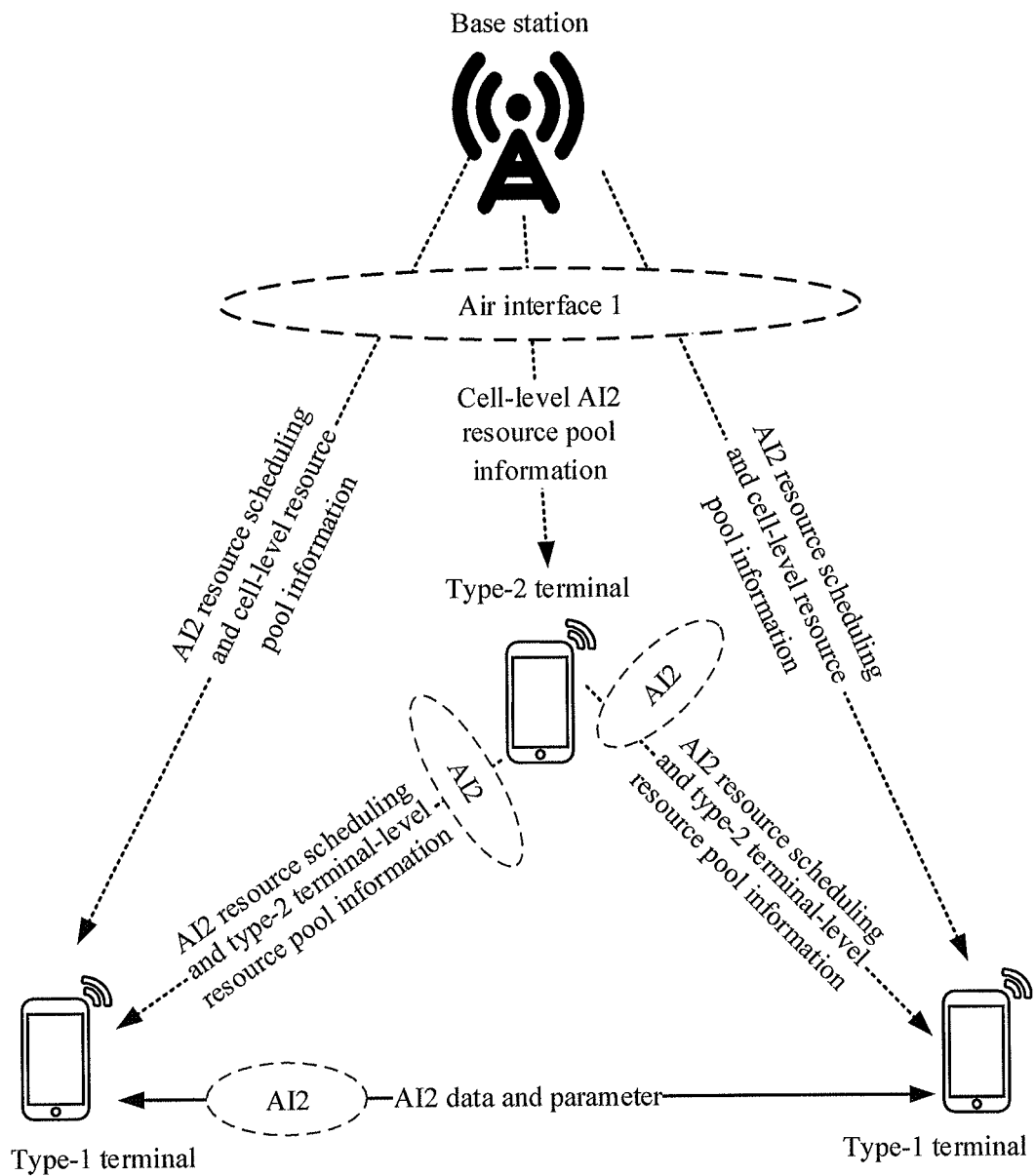
FIG. 3 is a schematic diagram of a system architecture according to an embodiment of the disclosure.

FIG. 3 is a schematic diagram of a system architecture according to an embodiment of the disclosure. As shown in FIG. 3, a system may be formed by a base station and two types of terminals (or called as terminal device), and they may communicate with one another through two types of Air Interfaces (AIs).

In the system shown in FIG. 3, the first type of interface is an AI (which may be called as AI1) between the base station and a terminal, and optionally, the first type of interface may be a Uu interface in a cellular mobile communication system. The second type of interface may be an AI (called as AI2) between the terminal and the terminal, and optionally, the second type of interface may be a Sidelink AI, and for example, may be a V2V interface and a V2I interface.

The base station may communicate with the two types of terminals through the AI1, and may receive Sidelink resource scheduling requests of the terminals through the AI1 and send corresponding resource grant information to the terminals through the AI1 for the terminals to configure resources for sending AI2 data and transmission parameters thereof according to the resource grant information.

The type-1 terminal may initiate an AI2 resource scheduling request to the base station through the AI1, initiate the AI2 resource scheduling request to the type-2 terminal through the AI2, receive AI2 resource grant information and cell-level AI2 resource pool information sent by the base station and receive AI2 resource grant information and type-2 terminal-level AI2 resource pool information from the type-2 terminal through the AI2, may autonomously select an AI2 resource from a cell-level AI2 resource pool, a type-2 terminal-level AI2 resource pool or a preconfigured resource pool and send data and a transmission parameter thereof to another type-1 terminal, and may further receive AI2 data and transmission parameter thereof sent by another terminal (which may be a type-1 terminal, and may also be a type-2 terminal).

The type-2 terminal may receive the AI2 resource scheduling request from the type-1 terminal through the AI2, schedule an AI2 resource for the type-1 terminal and send the corresponding resource grant information to the type-1 terminal through the AI2, and may receive cell-level AI2 resource pool information from the base station through the AI1, divide the type-2 terminal-level AI2 resource pool according to the cell-level AI2 resource pool information and send the resource pool information to the type-1 terminal through the AI2.

It is important to note that, in the embodiment of the disclosure, the cell-level resource pool is configured by the base station, and the cell-level resource pool information is information sent to the terminals by the base station and configured to indicate resources which may be used when the terminals are out of coverage of the base station. A terminal-level resource pool is divided from the cell-level resource pool by the terminal with a resource scheduling function, and includes resources which may be used in a Partial Coverage scenario of the terminal with the scheduling function, and terminal-level resource pool information is information sent to another terminal by the terminal with the scheduling function and configured to indicate the resources which may be used in the Partial Coverage scenario of the terminal with the scheduling function.

FIG. 4 is a schematic flowchart of a radio resource scheduling method according to an embodiment of the disclosure. As shown in FIG. 4, the method 100 includes the following steps.

In S110, a first-type terminal device determines whether to send resource scheduling request information to a base station and/or a second-type terminal device, wherein the first-type terminal device communicates with the base station through a first-type interface, the first-type terminal device communicates with the second-type terminal device through a second-type interface, the second-type terminal device communicates with the base station through the first-type interface, and the second-type terminal device has a resource scheduling function.

In S120, the first type-terminal device determines link resources configured for communication with other first-type terminal device according to a result of the determination.

In such a manner, according to the radio resource scheduling method of the embodiment of the disclosure, the first-type terminal device may select to send the resource scheduling request to at least one of the base station or the second-type terminal device with the resource scheduling function. Then, at least one of the base station or the second-type terminal device may perform scheduling for the first-type terminal device. Therefore, interference between terminals may be avoided, a transmission success rate may be increased, a transmission delay may be reduced, performance and reliability of a V2V system may be ensured, and a communication capacity of the V2V system may be expanded.

Moreover, furthermore, the second-type terminal device does not adopt a Radio Resource Control (RRC) connection manner in a radio resource scheduling process, but adopts a Media Access Control (MAC) direct transmission manner, does not occupy limited Physical Downlink Control Channels (PDCCHs) and Physical Uplink Control Channels (PUCCHs), and may form multilayer scheduling and cooperative scheduling with the base station. Therefore, even though the first-type terminal device is located in a scenario without coverage of the base station or with partial coverage of the base station, interference between the terminals may still be avoided, the transmission success rate may be increased, and the transmission delay may be reduced.

As an example, the first-type terminal device may be an OBU mentioned above, and the second-type terminal device may be an RSU mentioned above.

As an example, the first-type interface corresponds to a first type of interface mentioned above, the first-type interface may be a Uu interface, the second-type interface corresponds to a second type of interface mentioned above, and the second-type interface may be a V2V interface or a V2I interface.

Optionally, the first-type terminal device may determine whether to send the resource scheduling request information to at least one of the base station or the second-type terminal device according to at least one of the following information: whether the first-type terminal device is located within coverage of at least one of the base station or the second-type terminal device and has an effective connection, a movement velocity of the first-type terminal device, a signal coverage condition of the base station and a signal coverage condition of the second-type terminal device.

For example, when the first-type terminal device is located within the coverage of the base station but out of the coverage of the second-type terminal device and has an effective connection with the base station, the first-type terminal device selects to send the scheduling request information to the base station; or, when the first-type terminal device is located within the coverage of the base station and is also located within the coverage of the second-type terminal device, the first-type terminal device may select to send the resource scheduling request information to the one with a relatively higher coverage intensity. For another example, the first-type terminal device may select to send the resource scheduling request information to the base station in case of a relatively lower movement velocity to request the base station to grant the link resources to it; and the first-type terminal device may select to send the resource scheduling request information to the second-type terminal device when a signal coverage intensity of the base station is lower than a certain threshold value to request the second-type terminal device to grant the link resources to it.

It is important to note that, even though the first-type terminal device is located within the coverage of the base station or the second-type terminal device and has the effective connection, the first-type terminal device may also select not to send the resource scheduling request information to the base station and send the resource scheduling request information to the second-type terminal device, and instead, determines the required link resources according to resource pool information.

Moreover, furthermore, the first-type terminal device may send the resource scheduling request information to the base station, also send the resource scheduling request information to the second-type terminal device, receive resource grant information sent for the resource scheduling request information by the base station as well as resource grant information sent for the resource scheduling request information by the second-type terminal device, and then determine the link resources according to the resource grant information sent by the base station and the second-type terminal device respectively. For example, if receiving effective resource grant information sent by both the base station and the second-type terminal device respectively, the first-type terminal device may determine the required link resources according to the resource grant information sent by the second-type terminal device, or determine the required link resources according to the resource grant information sent by the base station, which will not be limited in the disclosure.

In the embodiment of the disclosure, optionally, the first-type terminal device may receive cell-level resource pool information sent by the base station and receive terminal-level resource pool information sent by the second-type terminal device.

Moreover, furthermore, the first-type terminal optionally sends first resource scheduling request information to the base station when determining to send the resource scheduling request information to the base station, and determines resources indicated by the resource grant information sent by the base station to be the link resources when receiving the resource grant information sent by the base station, or, determines whether to send the resource scheduling request information to at least one of the base station or the second-type terminal device when not receiving the resource grant information sent by the base station, and determines the link resources according to at least one of the cell-level resource pool information or the terminal-level resource pool information when determining not to send the resource scheduling request information to the base station and the second-type terminal device.

It is important to note that the first-type terminal device may further determine whether the resource grant information is effective when receiving the resource grant information sent by the base station and determine the resources indicated by the resource grant information to be the link resources when determining that it is effective, wherein that the resource grant information is effective may be understood as that the resource indicated by the resource grant information is in a preconfigured resource pool but is not in the cell-level resource pool, which may not form limits to the disclosure.

Optionally, that the first-type terminal device does not receive the resource grant information sent by the base station may be understood as that the first-type terminal device does not successfully receive the resource grant information sent by the base station within a preset time after sending the resource scheduling request information once to the base station, or may be understood as that the first-type terminal device sends the resource scheduling request information for N times to the base station but never receives the resource grant information sent by the base station, wherein the preset time may be set according to a practical requirement, and a value of N may also be set according to the practical requirement, which will not be limited in the disclosure.

In the embodiment of the disclosure, the first-type terminal device optionally sends second resource scheduling request information to the second-type terminal device when determining to send a resource scheduling request to the second-type terminal device, determines resources indicated by the resource grant information sent by the second-type terminal device to be the link resources when receiving effective resource grant information sent by the second-type terminal device, determines whether to send the resource scheduling request to at least one of the base station or the second-type terminal device when not receiving the effective resource allocation information sent by the second-type terminal device, and determines the link resources according to at least one of the cell-level resource pool information or the terminal-level resource pool information when determining not to send the resource scheduling request to the base station and the second-type terminal device.

Optionally, when the resource indicated by the resource grant information sent by the second-type terminal device is in resources indicated by the cell-level resource pool information and the resource indicated by the resource grant information sent by the second-type terminal device is not in resources indicated by the terminal-level resource pool information, it may be considered that the resource grant information is effective resource grant information. When the resource indicated by the resource grant information sent by the second-type terminal device is all or partially not in the resources indicated by the cell-level resource pool information or the resource indicated by the resource grant information sent by the second-type terminal device is in the resources indicated by the terminal-level resource pool information, it may be considered that the resource grant information is ineffective resource grant information. There are no limits made in the disclosure.

In the embodiment of the disclosure, optionally, when the first-type terminal device determines the link resources according to the cell-level resource pool information and the terminal-level resource pool information, a resource pool to be preferably adopted may be autonomously selected, and the link resources are determined from the resource pool to be preferably adopted; or, the first-type terminal device may select the resource pool to be preferably adopted according to a configuration of the base station and determine the link resources from the resource pool to be preferably adopted.

Optionally, the first-type terminal device may autonomously select the resource pool to be preferably adopted according to a rule which is specified by a standard or default. The base station may send the configuration of the base station to the first-type terminal device through RRC signaling.

Optionally, as an embodiment, for that the first-type terminal device may autonomously select the resource pool to be preferably adopted and determine the link resources from the resource pool to be preferably adopted as mentioned above, the resource may be autonomously selected specifically according to the following rule:

when it is determined that the terminal-level resource pool information is effective, part of or all resources in the resources indicated by the terminal-level resource pool information are determined to be the link resources; or, when it is determined that the terminal-level resource pool information is ineffective and the cell-level resource pool information is effective, part of or all resources in the resources indicated by the cell-level resource pool information are determined to be the link resources; or, when it is determined that the terminal-level resource pool information is ineffective and the cell-level resource pool information is ineffective, part of or all resources in the preconfigured resource pool are determined to be the link resources.

Specifically, the first-type terminal device may select the resource pool to be preferably adopted according to the default rule or the configuration of the base station, determines whether effective cell-level resource pool information is received if determining that the cell-level resource pool is preferably adopted, autonomously selects the resources from the cell-level resource pool if receiving the effective cell-level resource pool information, determines whether effective terminal-level resource pool information is received if not receiving the effective cell-level resource pool information, selects the resources from the terminal-level resource pool if receiving the effective terminal-level resource pool information, and selects the resources from the preconfigured resource pool if not receiving the effective terminal-level resource pool information. Whether the effective terminal-level resource pool information is received is determined if it is determined that the terminal-level resource pool is preferably adopted, the resources are selected from the terminal-level resource pool if the effective terminal-level resource pool information is received, whether the effective cell-level resource information is received is determined if the effective terminal-level resource pool information is not received, the resources are selected from the cell-level resource pool if the effective cell-level resource pool information is received, and the resources are selected from the preconfigured resource pool if the effective cell-level resource pool information is not received.

Moreover, furthermore, when the terminal-level resource pool information is ineffective, the first-type terminal device may determine part of or all resources in a common part of the resources indicated by the terminal-level resource pool information and the resources indicated by the cell-level resource pool to be the link resources. That is, the first-type terminal device may select the resources from an intersection of the terminal-level resource pool and the cell-level resource pool to send data and a transmission parameter thereof.

Optionally, that the terminal-level resource pool information is effective may be understood as that the terminal-level resource pool indicated by the terminal-level resource pool information is within the cell-level resource pool indicated by the cell-level resource pool information, and when the resource pool indicated by the terminal-level resource pool is partially or completely not in the cell-level resource pool indicated by the cell-level resource pool information, it may be considered that the terminal-level resource pool information is ineffective. That the cell-level resource pool information is effective may be understood as that the first-type terminal device successfully receives the cell-level resource pool information, which does not form limits to the disclosure.

Optionally, as an example, even though it is determined that the terminal-level resource pool is preferably adopted and the terminal-level resource pool information is effective, the first-type terminal device may also directly select the resources from the cell-level resource pool autonomously or according to the configuration of the base station, or even though it is determined that the cell-level resource pool is preferably adopted and the cell-level resource pool information is effective, the first-type terminal device may also directly select the resources from the terminal-level resource pool autonomously or according to the configuration of the base station.

Figure 5:
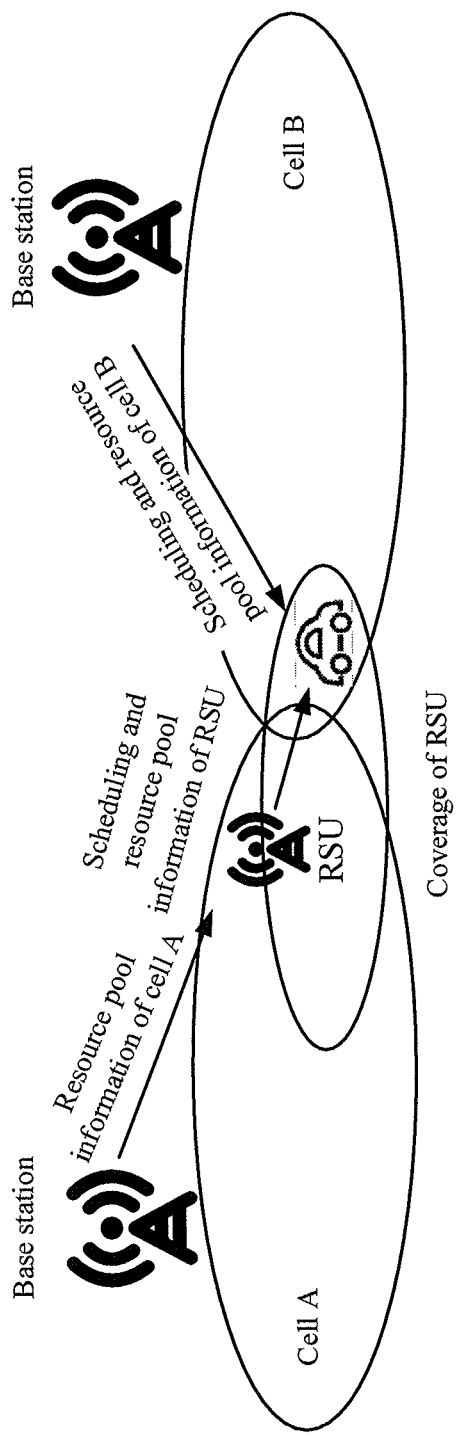
FIG. 5 is a scenario diagram of a resource grant and resource pool division conflict according to an embodiment of the disclosure.

Therefore, when the resource scheduling method of the embodiment of the disclosure is adopted, even in case of a resource scheduling and resource pool division conflict shown in FIG. 5, the first-type terminal device may actively avoid resources which may conflict, so that reduction of system performance is avoided.

Specifically, in FIG. 5, coverage of an RSU is right at a junction part of two adjacent cells, and there may exist the condition that "the RSU is located in coverage of the cell A and some terminals in the coverage of the RSU are located in coverage of the cell B". At this moment, scheduling information and terminal-level resource pool information sent to a terminal by the RSU are selected and divided on the basis of a cell-level resource pool of the cell A, and may conflict with a cell-level resource pool of the cell B where the terminal is located, and if the terminal still uses a scheduling and resource pool of the cell A, interference to scheduling or resource pool division of the cell B may be produced. While if the resource scheduling method of the embodiment of the disclosure is adopted, in case of a conflict between scheduling and terminal-level resource pool division of the RSU and the base station, the terminal only adopts a resource scheduling and resource pool not conflicting with the base station to send data and a transmission parameter thereof, so that reduction of system performance is avoided.

Figure 6:
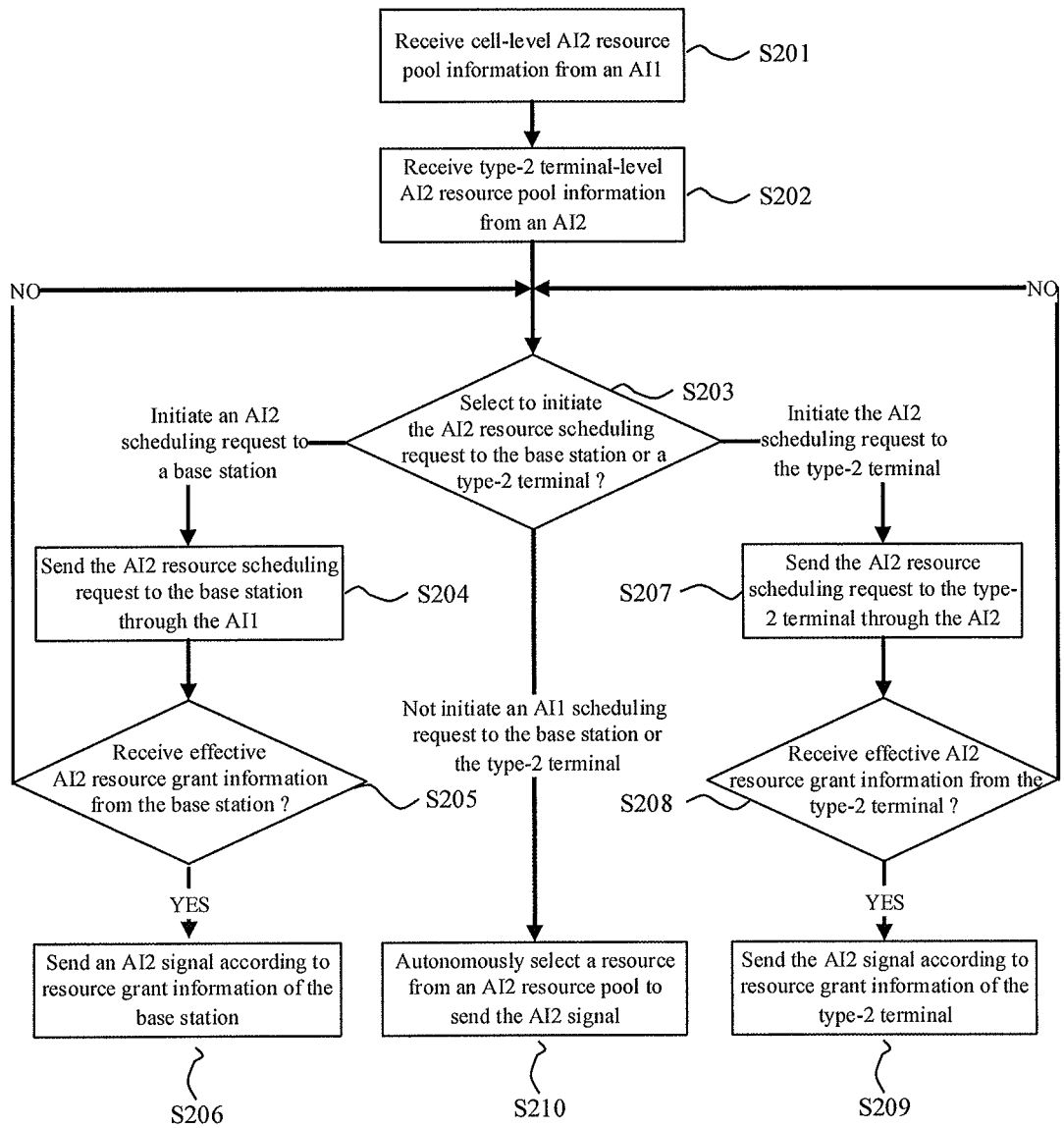
FIG. 6 is a schematic flowchart of a radio resource scheduling method according to a specific embodiment of the disclosure.

FIG. 6 is a radio resource scheduling method according to a specific embodiment of the disclosure. It is important to note that this example is intended only to help those skilled in the art to understand the embodiment of the disclosure better but not to limit the scope of the embodiment of the disclosure. The method of FIG. 6 is executed by a type-1 terminal (corresponding to the first-type terminal device mentioned above). As shown in FIG. 6, the method 200 includes the following steps.

In S201, cell-level AI2 resource pool information sent by a base station is received through an AI1.

The AI1 is an interface between the base station and the type-1 terminal.

In S202, type-2 terminal-level AI2 resource pool information sent by a type-2 terminal is received through an AI2.

The AI2 is an interface between the type-2 and type-1 terminals.

In S203, the type-1 terminal selects whether to initiate an AI2 resource scheduling request to the base station or initiate the AI2 resource scheduling request to the type-2 terminal.

In S204, if deciding to initiate the AI2 resource scheduling request to the base station, the type-1 terminal sends the AI2 resource scheduling request to the base station through the AI1.

In S205, the type-1 terminal judges whether effective AI2 resource grant information is received from the base station.

In S206, an AI2 signal is sent according to the resource grant information of the base station.

Specifically, if the type-1 terminal receives the effective AI2 resource grant information from the base station, resources indicated by the resource grant information are adopted to send AI2 data and a transmission parameter thereof to another type-1 terminal. If the effective AI2 resource grant information is not received from the base station, S203 is re-executed, and the object to which the AI2 resource scheduling request is initiated is reselected.

In S207, if deciding to initiate the AI2 resource scheduling request to the type-2 terminal, the type-1 terminal sends the AI2 resource scheduling request to the type-2 terminal through the AI2.

In S208, the type-1 terminal judges whether effective AI2 resource grant information is received from the type-2 terminal.

In S209, the AI2 signal is sent according to the resource grant information of the type-1 terminal.

Specifically, if the type-1 terminal receives the effective AI2 resource grant information from the type-2 terminal, resources indicated by the resource grant information are adopted to send the AI2 data and the transmission parameter thereof to the other type-1 terminal. If the effective AI2 resource grant information is not received from the type-2 terminal, S203 is re-executed, and the object to which the AI2 resource scheduling request is initiated is reselected.

In S210, if the type-1 terminal decides not to initiate the AI2 resource scheduling request to the base station or the type-2 terminal any more in S203, resources are autonomously selected from an AI2 resource pool to send the AI2 data and the transmission parameter thereof.

Figure 7:
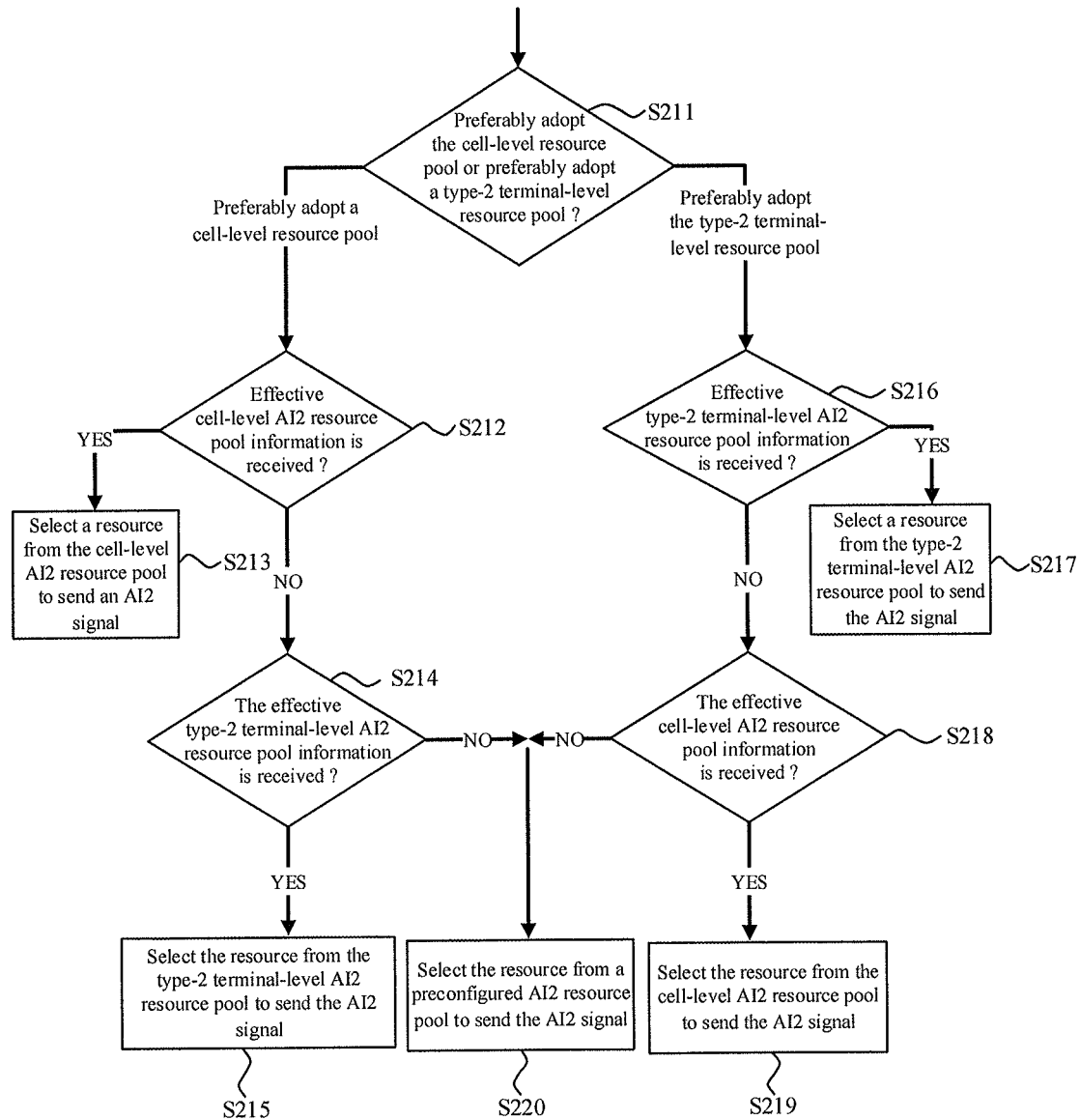
FIG. 7 is a schematic flowchart of a method for executing resource selection by a first-type terminal device according to an embodiment of the disclosure.

Optionally, the type-1 terminal may select the resources according to a method shown in FIG. 7 in S210, and as shown in FIG. 7, S210 specifically includes the following steps.

In S211, the type-1 terminal selects whether to preferably adopt a cell-level resource pool or preferably adopt a type-2 terminal-level resource pool.

Optionally, the type-1 terminal may select the specific resource pool to be preferably adopted according to the abovementioned method in S211.

In S212, when the type-I terminal determines to preferably adopt the cell-level resource pool, whether effective cell-level AI2 resource pool information is received is judged.

In S213, when it is determined that the effective cell-level AI2 resource pool information is received, a resource is selected from the cell-level resource pool to send the AI2 signal.

In S214, when it is determined that the effective cell-level AI2 resource pool information is not received, whether effective type-2 terminal-level AI2 resource pool information is received is determined.

In S215, when it is determined in S214 that the effective type-2 terminal-level AI2 resource pool information is received, the resource is selected from the type-2 terminal-level AI2 resource pool to send the AI2 signal.

In S216, when the type-1 terminal determines to preferably adopt the type-2 terminal-level resource pool, whether the effective type-2 terminal-level AI2 resource pool information is received is judged.

In S217, when it is determined that the effective type-2 terminal-level AI2 resource pool information is received, the resource is selected from the type-2 terminal-level resource pool to send the AI2 signal.

In S218, when it is determined that the effective type-2 terminal-level AI2 resource pool information is not received, whether the effective cell-level AI2 resource pool information is received is determined.

In S219, when it is determined in S218 that the effective cell-level AI2 resource pool information is received, the resource is selected from the cell-level AI2 resource pool to send the AI2 signal.

In S220, when it is determined in S214 that the effective type-2 terminal-level AI2 resource pool information is not received or it is determined in S219 that the effective cell-level AI2 resource pool information is not received, the resource is selected from a preconfigured AI2 resource pool to send the AI2 signal.

It should be understood that a magnitude of a sequence number of each process does not refer to an execution sequence, and the execution sequence of each process should be determined according to its function and internal logic and not form any limit to an implementation process of the embodiment of the disclosure.

In the method 200, the type-1 terminal corresponds to the first-type terminal device mentioned above, the type-2 terminal corresponds to the second-type terminal device mentioned above, the AI1 corresponds to the first-type interface mentioned above, the AI2 corresponds to the second-type interface mentioned above, the cell-level AI2 resource pool corresponds to the cell-level resource pool mentioned above, and the type-2 terminal-level AI2 resource pool corresponds to the terminal-level resource pool mentioned above.

In such a manner, according to the radio resource scheduling method of the embodiment of the disclosure, the first-type terminal device may select to send the resource scheduling request to at least one of the base station or the second-type terminal device with the resource scheduling function. Then, at least one of the base station or the second-type terminal device may perform scheduling for the first-type terminal device. Therefore, interference between terminals may be avoided, a transmission success rate may be increased, a transmission delay may be reduced, performance and reliability of a V2V system may be ensured, and a communication capacity of the V2V system may be expanded.

The radio resource scheduling method according to the embodiment of the disclosure is described above in detail from a first-type terminal device side in combination with FIG. 4 to FIG. 7, and a radio resource scheduling method according to another embodiment of the disclosure will be described below in detail from a second-type terminal device side in combination with FIG. 8 to FIG. 11. It should be understood that interaction of a second-type terminal device and a first-type terminal device, related characteristics and functions and the like described on the first-type terminal device side correspond to descriptions on the second-type terminal device side, and for simplicity, repeated descriptions are properly eliminated.

FIG. 8 shows a radio resource scheduling method according to another embodiment of the disclosure. As shown in FIG. 8, the method 300 includes the following steps.

In S310, a second-type terminal device receives resource scheduling request information sent by a first-type terminal device, wherein the second-type terminal device communicates with a base station through a first-type interface, the first-type terminal device communicates with the base station through the first-type interface, and the second-type terminal device communicates with the first-type terminal device through a second-type interface.

In S320, the second-type terminal device sends resource grant information to the first-type terminal device for the first-type terminal device to determine link resources configured for communication with other first-type terminal device according to the resource grant information.

In such a manner, according to the resource scheduling method of the embodiment of the disclosure, the second-type terminal device has a resource scheduling function, and may dynamically schedule a sending resource of a terminal instead of the base station when the terminal is located in a scenario with partial coverage of the base station or without coverage of the base station. Therefore, a transmission success rate is increased, a transmission delay is reduced, and performance and reliability of a V2V system are ensured.

Moreover, furthermore, resource scheduling of the second-type terminal device shares a scheduling task of the base station on the first-type interface, reduces network loads of PDCCHs and PUCCHs of a cellular network, and may reserve more control channel resources for cellular communication services. Moreover, multiple pieces of second-type terminal device may be deployed within coverage of the base station to form multiple frequency multiplexing regions, and higher frequency utilization efficiency is achieved by more detailed frequency multiplexing.

In the embodiment of the disclosure, optionally, the second-type terminal device may determine whether cell-level resource pool information sent by the base station is received, send terminal-level resource pool information to the first-type terminal device according to the cell-level resource pool information when determining that the cell-level resource pool information sent by the base station is received, determine the resource grant information according to the resource scheduling request information, the cell-level resource pool information and the terminal-level resource pool information, and then send the resource grant information to the first-type terminal device.

Specifically, when the second-type terminal device receives the cell-level resource pool information sent by the base station, part of resources in resources indicated by the cell-level resource pool information may be determined to form a terminal-level resource pool, and the terminal-level resource pool information indicating the terminal-level resource pool is sent to the first-type terminal device. Or, in other words, the second-type terminal device may further divide a cell-level resource pool after receiving the cell-level resource pool information, divide part of resources from the cell-level resource resources for scheduling and determine the other resources to form the terminal-level resource pool, and then the first-type terminal device autonomously selects the resources therefrom for use.

Figure 9:
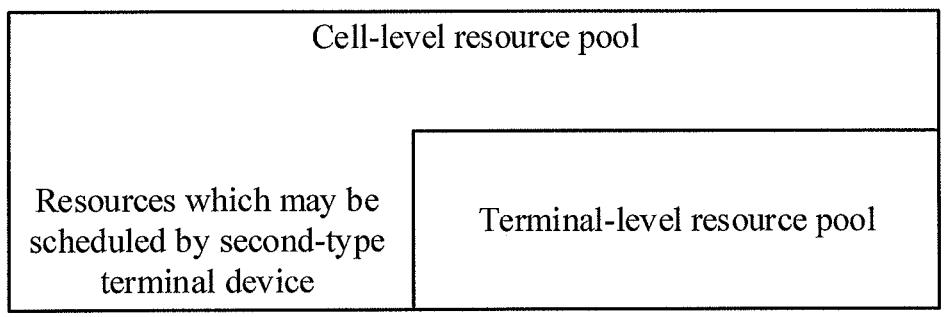
FIG. 9 is a schematic diagram of a resource pool division method according to an embodiment of the disclosure.

For example, if the second-type terminal device receives the cell-level resource pool information (the second-type terminal device is located within the coverage of the base station (In Coverage scenario)), as shown in FIG. 9, the second-type terminal device may divide part of resources from the cell-level resource pool indicated by the cell-level resource pool information to form the terminal-level resource pool, and the other part may be configured for dynamic resource scheduling of the second-type terminal device for the first-type terminal device.

Moreover, furthermore, the second-type terminal device sends configuration information to the base station, the configuration information indicating a related configuration of the second-type terminal device, for the base station to perform scheduling for the first-type terminal device according to the configuration information.

Specifically, the configuration information sent by the second-type terminal device may include any one of the following information: the terminal-level resource pool information, location information of the second-type terminal device and signal coverage capability information of the second-type terminal device.

Therefore, the second-type terminal device may report own configuration information to the base station to implement cooperative scheduling between the base station and the second-type terminal device.

In the embodiment of the disclosure, optionally, when the second-type terminal device does not receive the cell-level resource pool information sent by the base station, the terminal-level information resource pool information may be sent to the first-type terminal device according to a preconfigured resource pool; and the resource grant information is determined according to the resource scheduling request information, the preconfigured resource pool and the terminal-level resource pool information, and then the resource grant information is sent to the first-type terminal device.

Specifically, the second-type terminal device determines part of resources in the preconfigured resource pool to form the terminal-level resource pool, and sends the terminal-level resource pool information indicating the terminal-level resource pool to the first-type terminal device.

Figure 10:
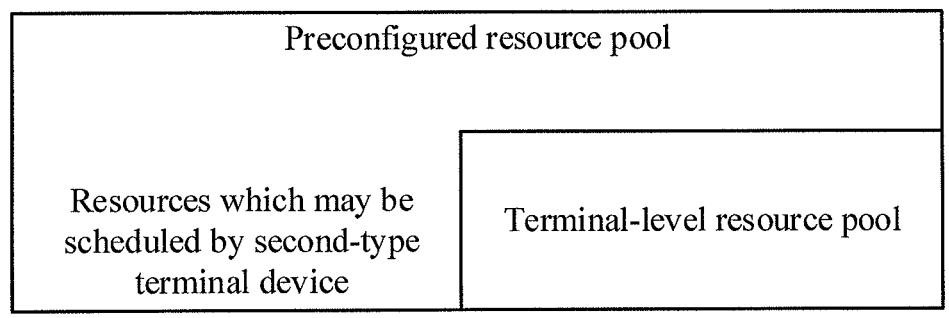
FIG. 10 is a schematic diagram of a resource pool division method according to another embodiment of the disclosure.

For example, if the second-type terminal device does not receive the cell-level resource pool information sent by the base station (the second-type terminal device is not within the coverage of the base station (Out of Coverage scenario)), as shown in FIG. 10, the second-type terminal device may divide a part of the preconfigured resource pool as the terminal-level resource pool, and the other resources may be configured for scheduling of the second-type terminal device for the first-type terminal device.

Optionally, as an example, the first-type interface is a Uu interface, and/or, the second-type interface is a V2V interface or a V2I interface.

Figure 11:
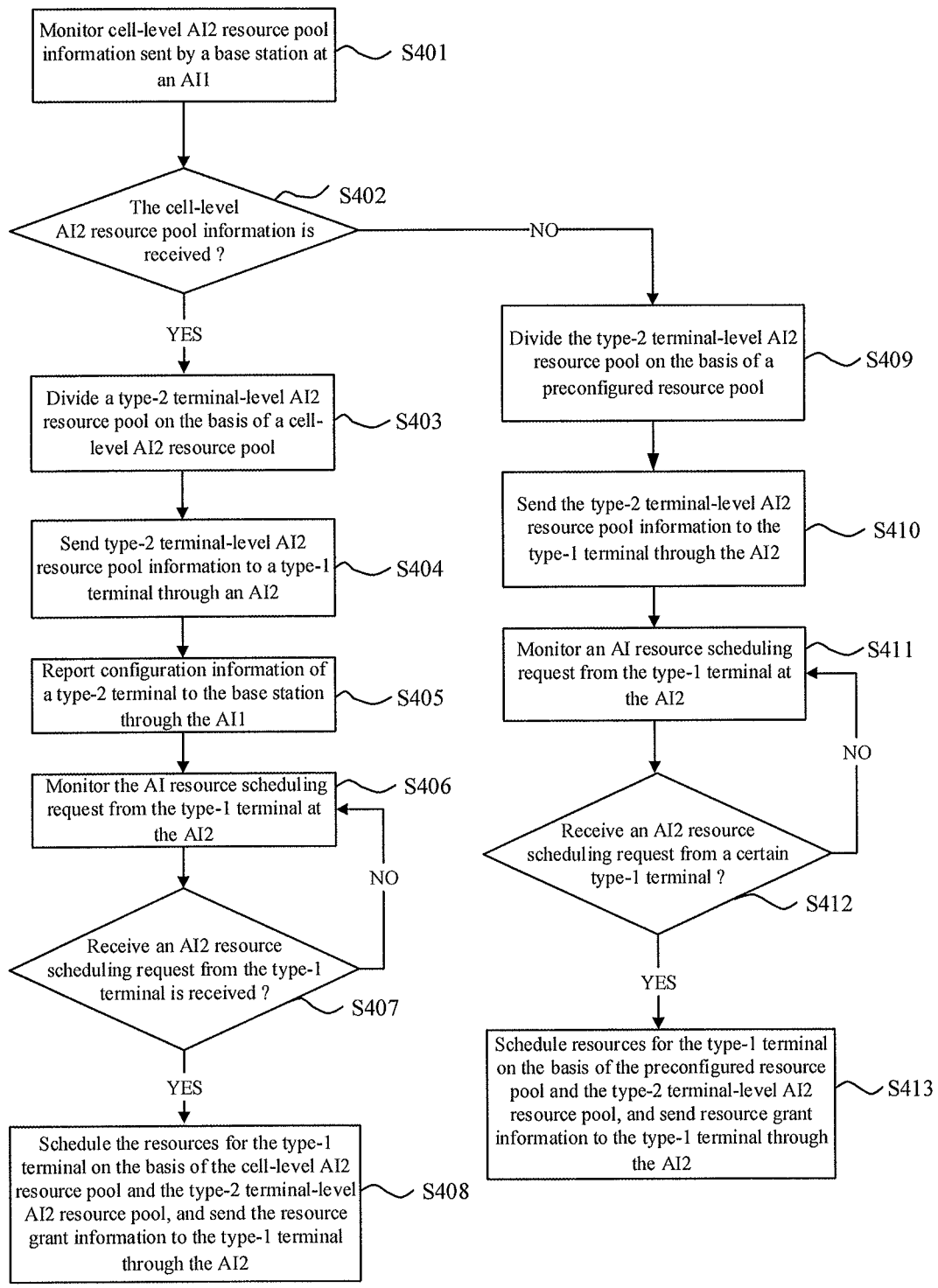
FIG. 11 is a schematic flowchart of a radio resource scheduling method according to another specific embodiment of the disclosure.

FIG. 11 is a radio resource scheduling method according to another specific embodiment of the disclosure. It is important to note that this example is intended only to help those skilled in the art to understand the embodiment of the disclosure better but not to limit the scope of the embodiment of the disclosure. The method of FIG. 11 is executed by a type-2 terminal (corresponding to the second-type terminal device mentioned above). As shown in FIG. 11, the method 400 includes the following steps.

In S401, cell-level AI2 resource pool information sent by a base station is received through an AI1.

In S402, the type-2 terminal judges whether the cell-level AI2 resource pool information sent by the base station is received.

In S403, if the type-2 terminal receives the cell-level AI2 resource pool information, a type-2 terminal-level resource pool is divided on the basis of the cell-level AI2 resource pool information.

In S404, the type-2 terminal sends type-2 terminal-level resource pool information to a type-1 terminal through an AI2.

In S405, the type-2 terminal reports own configuration information to the base station through the AI1.

In S406, the type-2 terminal continuously monitors an AI2 resource scheduling request from the type-1 terminal on the AI2.

In S407, the type-2 terminal judges whether the AI2 resource scheduling request is received from the type-1 terminal.

In S408, if the type-2 terminal receives the AI2 resource scheduling request from the type-1 terminal, AI2 resources are scheduled for the type-1 terminal on the basis of a cell-level AI2 resource pool and the type-2 terminal-level AI2 resource pool, and corresponding AI2 resource configuration information is sent to the type-1 terminal through the AI2.

In S409, if the type-2 terminal does not receive the cell-level AI2 resource pool information, the type-2 terminal-level AI2 resource pool is divided on the basis of a preconfigured AI2 resource pool.

In S410, the type-2 terminal sends the type-2 terminal-level resource pool information to the type-1 terminal through the AI2.

In S411, the type-2 terminal continuously monitors the AI2 resource scheduling request from the type-1 terminal on the AI2.

In S412, the type-2 terminal judges whether the AI2 resource scheduling request is received from the type-1 terminal.

In S413, if the type-2 terminal receives the AI2 resource scheduling request from the type-1 terminal, the AI2 resources are scheduled for the type-1 terminal on the basis of the preconfigured AI2 resource pool and the type-2 terminal-level AI2 resource pool, and the corresponding AI2 resource configuration information is sent to the type-1 terminal through the AI2.

It is important to note that, in the method 400, the type-1 terminal corresponds to the first-type terminal device mentioned above, the type-2 terminal corresponds to the second-type terminal device mentioned above, the AI1 corresponds to the first-type interface mentioned above, the AI2 corresponds to the second-type interface mentioned above, and S405 is an optional step, that is, the type-2 terminal may not report own configuration information to the base station.

In such a manner, according to the radio resource scheduling method of the embodiment of the disclosure, the second-type terminal device has a resource scheduling function, and may dynamically schedule a sending resource of a terminal instead of the base station when the terminal is located in a scenario with partial coverage of the base station or without coverage of the base station. Therefore, a transmission success rate is increased, a transmission delay is reduced, and performance and reliability of a V2V system are ensured.

The radio resource scheduling method according to the embodiment of the disclosure will be described below in detail from a base station side in combination with FIG. 12. As shown in FIG. 12, the method 400 includes the following steps.

In S410, a base station sends cell-level resource pool information to a first-type terminal device and a second-type terminal device, wherein the base station communicates with the first-type terminal device through a first-type interface, the base station communicates with the second-type terminal device through the first-type interface, and the first-type terminal device communicates with the second-type terminal device through a second-type interface.

In S420, the base station receives a resource scheduling request sent by the first-type terminal device.

In S430, the base station sends resource grant information to the first-type terminal device according to the resource scheduling request for the first-type terminal device to determine link resources configured for communication with other first-type terminal device according to the resource grant information.

In such a manner, according to the radio resource scheduling method of the embodiment of the disclosure, the base station may send the cell-level resource pool information to the second-type terminal device, and the second-type terminal device has a resource scheduling function. Then, when the terminal device is located within coverage of the base station, scheduling may be performed for the terminal device through the base station, and when the terminal device is located in a scenario with partial coverage of the base station or without the coverage of the base station, a sending resource of a terminal may be dynamically scheduled through the second-type terminal device. Therefore, a transmission success rate may be increased, a transmission delay may be reduced, and performance and reliability of a V2V system may be ensured.

In the embodiment of the disclosure, optionally, the base station may receive configuration information sent by the second-type terminal device, the configuration information indicating a related configuration of the second-type terminal device, for the base station to perform scheduling for the first-type terminal device according to the configuration information.

In the embodiment of the disclosure, optionally, the configuration information includes any one of the following information: terminal-level resource pool information, location information of the second-type terminal device and signal coverage capability information of the second-type terminal.

Optionally, as an example, the first-type interface is a Uu interface, and/or, the second-type interface is a V2V interface or a V2I interface.

In such a manner, according to the radio resource scheduling method of the embodiment of the disclosure, the base station may send the cell-level resource pool information to the second-type terminal device, and the second-type terminal device has the resource scheduling function. Then, when the terminal device is located within the coverage of the base station, scheduling may be performed for the terminal device through the base station, and when the terminal device is located in a scenario with partial coverage of the base station or without the coverage of the base station, the sending resource of the terminal may be dynamically scheduled through the second-type terminal device. Therefore, the transmission success rate may be increased, the transmission delay may be reduced, and the performance and reliability of the V2V system may be ensured.

Figure 13:
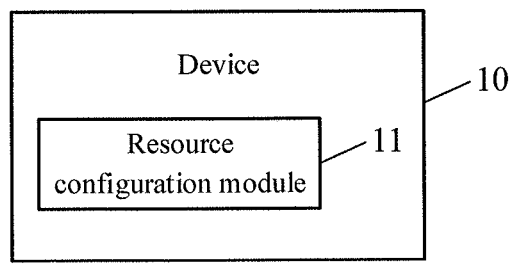
FIG. 13 is a schematic block diagram of a device according to an embodiment of the disclosure.

A device according to the embodiments of the disclosure will be described below in combination with FIG. 13 in detail. As shown in FIG. 13, the device 10 includes:

a resource configuration module 11, configured to determine whether to send resource scheduling request information to a base station and/or a second-type terminal device, wherein the device communicates with the base station through a first-type interface, the device communicates with the second-type terminal device through a second-type interface, the second-type terminal device communicates with the base station through the first-type interface, and the second-type terminal device has a resource scheduling function; and the resource configuration module 11 is further configured to determine link resources configured for communication with another device according to a result of the determination.

In such a manner, the device of the embodiment of the disclosure may select to send the resource scheduling request to at least one of the base station or the second-type terminal device with the resource scheduling function. Then, at least one of the base station or the second-type terminal device may perform scheduling for the first-type terminal device. Therefore, interference between terminals may be avoided, a transmission success rate may be increased, a transmission delay may be reduced, performance and reliability of a V2V system may be ensured, and a communication capacity of the V2V system may be expanded.

Figure 14:
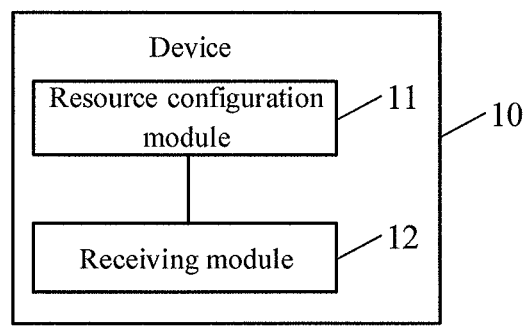
FIG. 14 is another schematic block diagram of a device according to an embodiment of the disclosure.

Optionally, as shown in FIG. 14, the device further includes:

a receiving module 12, configured to receive cell-level resource pool information sent by the base station; and the receiving module 12 is further configured to receive terminal-level resource pool information sent by the second-type terminal device.

Figure 15:
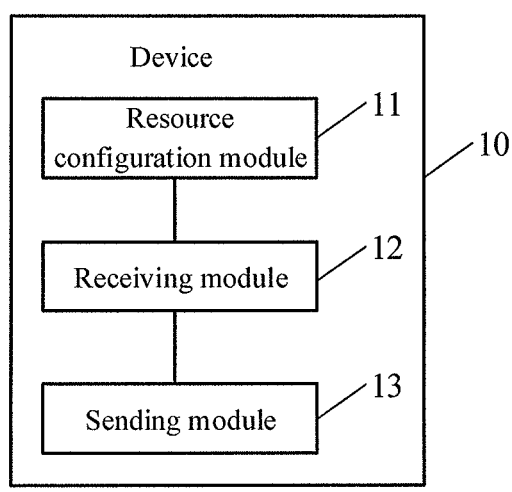
FIG. 15 is another schematic block diagram of a device according to an embodiment of the disclosure.

Optionally, as shown in FIG. 15, the device further includes:

a sending module 13, configured to, when the resource configuration module 11 determines to send the resource scheduling request information to the base station, send first resource scheduling request information to the base station, wherein the resource configuration module 11 is configured to:

when the receiving module 12 receives resource grant information sent by the base station, determine resources indicated by the resource grant information sent by the base station to be the link resources, or, when the receiving module 12 does not receive the resource grant information sent by the base station, determine whether to send the resource scheduling request information to at least one of the base station or the second-type terminal device, and when determining not to send the resource scheduling request information to the base station and the second-type terminal device, determine the link resources according to at least one of the cell-level resource pool information or the terminal-level resource pool information.

In the embodiment of the disclosure, optionally, the sending module 13 is configured to, when a resource scheduling request is determined to be sent to the second-type terminal device, send second resource scheduling request information to the second-type terminal device, wherein the resource configuration module 11 is configured to:

when the receiving module 12 receives effective resource grant information sent by the second-type terminal device, determine resources indicated by the resource grant information sent by the second-type terminal device to be the link resources, or, when the receiving module 12 does not receive the effective resource grant information sent by the second-type terminal device, determine whether to send the resource scheduling request to at least one of the base station or the second-type terminal device, and when determining not to send the resource scheduling request to the base station and the second-type terminal device, determine the link resources according to at least one of the cell-level resource pool information or the terminal-level resource pool information.

In the embodiment of the disclosure, optionally, the sending module 13 is configured to, when the resource configuration module 11 determines to send the resource scheduling request information to the base station and the second-type terminal device, send third resource scheduling request information to the base station and send fourth resource scheduling request information to the second-type terminal device, wherein the receiving module 12 is configured to:

receive resource grant information sent for the third resource scheduling request information by the base station, and receive resource grant information sent for the fourth resource scheduling request information by the second-type terminal device, wherein the resource configuration module 11 is configured to:

determine the link resources according to the resource grant information for the third resource scheduling request information and the resource grant information for the fourth resource scheduling request information.

In the embodiment of the disclosure, optionally, the resource configuration module 11 is further configured to:

when determining not to send the resource scheduling request to the base station and the second-type terminal device, determine the link resources according to the cell-level resource pool information and the terminal-level resource pool information.

In the embodiment of the disclosure, optionally, the resource configuration module 11 is specifically configured to:

autonomously select a resource pool to be preferably adopted according to the cell-level resource pool information and the terminal-level resource pool information, and determine the link resources from the resource pool to be preferably adopted; or, select the resource pool to be preferably adopted according to a configuration of the base station, and determine the link resources from the resource pool to be preferably adopted.

In the embodiment of the disclosure, optionally, the resource configuration module 11 is specifically configured to:

when it is determined that the terminal-level resource pool information is effective, determine part of or all resources in resources indicated by the terminal-level resource pool information to be the link resources; or, when it is determined that the terminal-level resource pool information is ineffective and the cell-level resource pool information is effective, determine part of or all resources in resources indicated by the cell-level resource pool information to be the link resources; or, when it is determined that the terminal-level resource pool information is ineffective and the cell-level resource pool information is ineffective, determine part or all of resources in a preconfigured resource pool to be the link resources.

In the embodiment of the disclosure, optionally, the resource configuration module 11 is further configured to:

when it is determined that the terminal-level resource pool information is ineffective, determine part or all of resources in a common part of the resources indicated by the terminal-level resource pool information and the resources indicated by the cell-level resource pool information to be the link resources.

In the embodiment of the disclosure, optionally, the resource configuration module 11 is specifically configured to:

determine whether to send the resource scheduling request information to at least one of the base station or the second-type terminal device according to at least one of the following information: whether the device is located within coverage of at least one of the base station or the second-type terminal device and has an effective connection, a movement velocity of the device, a signal coverage condition of the base station and a signal coverage condition of the second-type terminal device.

In the embodiment of the disclosure, optionally, the first-type interface is a Uu interface, and/or, the second-type interface is a V2V interface of a V2I interface.

In the embodiment of the disclosure, optionally, the device is an OBU, and/or, the second-type terminal device is an RSU.

Figure 16:
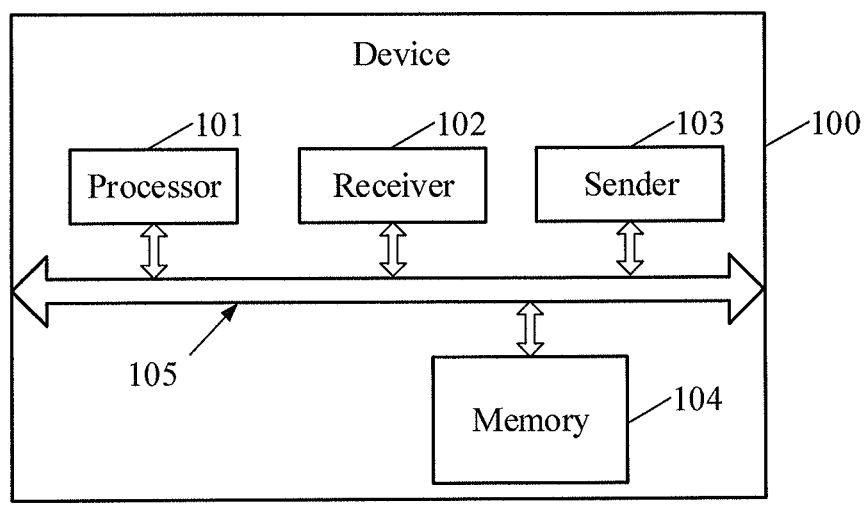
FIG. 16 is a schematic block diagram of a device according to another embodiment of the disclosure.

It is important to note that, in the embodiment of the disclosure, the resource configuration module 11 may be implemented by a processor, the receiving module 12 may be implemented by a receiver, and the sending module 13 may be implemented by a sender. As shown in FIG. 16, a device 100 may include a processor 101, a receiver 102, a sender 103 and a memory 104, wherein the memory 104 may be configured to store codes executed by the processor 101 and the like.

Each component in the device 100 is coupled together through a bus system 105, wherein the bus system 105 includes a data bus, and further includes a power bus, a control bus and a state signal bus.

The device 10 shown in FIG. 13 to FIG. 15 or the device 100 shown in FIG. 16 may implement each process implemented in the method embodiment of FIG. 4, which will not be elaborated for avoiding repetitions.

Figure 17:
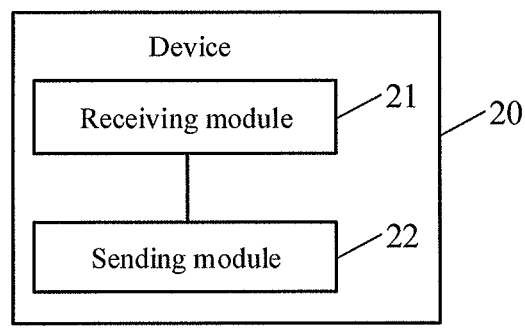
FIG. 17 is a schematic block diagram of a device according to another embodiment of the disclosure.

A device according to another embodiment of the disclosure will be described below in combination with FIG. 17 in detail. As shown in FIG. 17, the device 20 includes:

a receiving module 21, configured to receive resource scheduling request information sent by first-type terminal device, wherein the device communicates with a base station through a first-type interface, the first-type terminal device communicates with the base station through the first-type interface, and the device communicates with the first-type terminal device through a second-type interface; and a sending module 22, configured to send resource grant information to the first-type terminal device for the first-type terminal device to determine link resources configured for communication with other first-type terminal device according to the resource grant information.

In such a manner, the device according to the embodiment of the disclosure has a resource scheduling function, and may dynamically schedule a sending resource of a terminal instead of the base station when the terminal is located in a scenario with partial coverage of the base station or without coverage of the base station. Therefore, a transmission success rate is increased, a transmission delay is reduced, and performance and reliability of a V2V system are ensured.

Figure 18:
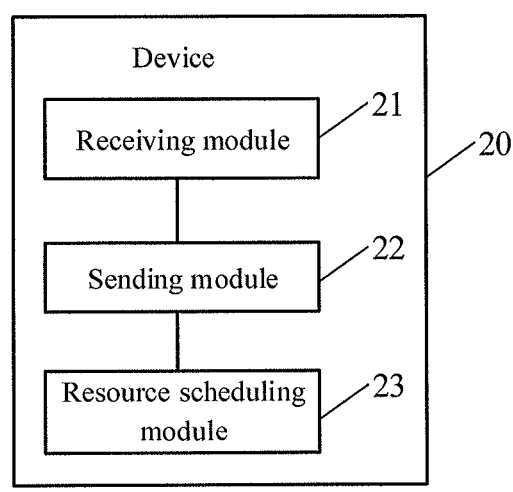
FIG. 18 is another schematic block diagram of a device according to another embodiment of the disclosure.

In the embodiment of the disclosure, optionally, as shown in FIG. 18, the device further includes:

a resource scheduling module 23, configured to determine whether the receiving module receives cell-level resource pool information sent by the base station, wherein the sending module 22 is specifically configured to: when the resource scheduling module determines that the receiving module receives the cell-level resource pool information sent by the base station, send terminal-level resource pool information to the first-type terminal device according to the cell-level resource pool information;

the resource scheduling module 23 is further configured to determine the resource grant information according to the resource scheduling request information, the cell-level resource pool information and the terminal-level resource pool information; and the sending module 22 is further configured to send the resource grant information to the first-type terminal device.

In the embodiment of the disclosure, optionally, the resource scheduling module 23 is specifically configured to:

determine part of resources in resources indicated by the cell-level resource pool information to form a terminal-level resource pool, wherein the sending module 22 is specifically configured to:

send the terminal-level resource pool information indicating the terminal-level resource pool to the first-type terminal device.

In the embodiment of the disclosure, optionally, the sending module 22 is further configured to:

send configuration information to the base station, the configuration information indicating a related configuration of the device, for the base station to perform scheduling for the first-type terminal device according to the configuration information.

In the embodiment of the disclosure, optionally, the configuration information includes any one of the following information: the terminal-level resource pool information, location information of the device and signal coverage capability information of the device.

In the embodiment of the disclosure, optionally, the resource scheduling module 23 is configured to determine whether the receiving module receives the cell-level resource pool information sent by the base station, wherein the sending module 22 is specifically configured to: when the resource scheduling module 23 determines that the receiving module 21 does not receive the cell-level resource pool information sent by the base station, send the terminal-level resource pool information to the first-type terminal device according to a preconfigured resource pool;

the resource scheduling module 23 is further configured to determine the resource grant information according to the resource scheduling request information, the preconfigured resource pool and the terminal-level resource pool information; and the sending module 22 is further configured to send the resource grant information to the first-type terminal device.

In the embodiment of the disclosure, optionally, the resource scheduling module 23 is specifically configured to:

determine part of resources in the preconfigured resource pool to form the terminal-level resource pool, wherein the sending module 22 is specifically configured to:

send the terminal-level resource pool information indicating the terminal-level resource pool to the first-type terminal device.

In the embodiment of the disclosure, optionally, the first-type interface is a Uu interface, and/or, the second-type interface is a V2V interface or a V2I interface.

In the embodiment of the disclosure, optionally, the first-type terminal device is an OBU, and/or, the device is an RSU.

Figure 19:
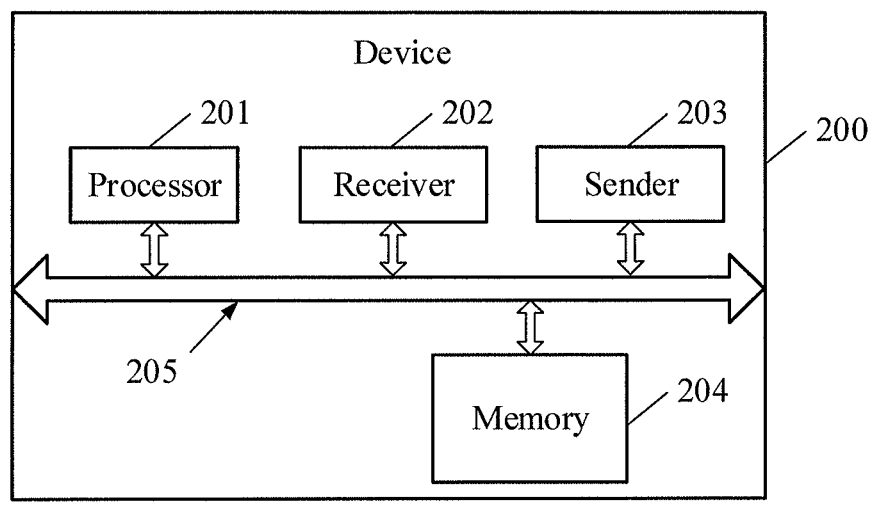
FIG. 19 is a schematic block diagram of a device according to another embodiment of the disclosure.

It is important to note that, in the embodiment of the disclosure, the receiving module 21 may be implemented by a receiver, the sending module 22 may be implemented by a sender, and the resource scheduling module 23 may be implemented by a processor. As shown in FIG. 19, a device 200 may include a processor 201, a receiver 202, a sender 203 and a memory 204, wherein the memory 204 may be configured to store codes executed by the processor 201 and the like.

Each component in the device 200 is coupled together through a bus system 205, wherein the bus system 205 includes a data bus, and further includes a power bus, a control bus and a state signal bus.

The device 20 shown in FIG. 17 or FIG. 18 or the device 200 shown in FIG. 19 may implement each process implemented in the method embodiment of FIG. 8, which will not be elaborated for avoiding repetitions.

Figure 20:
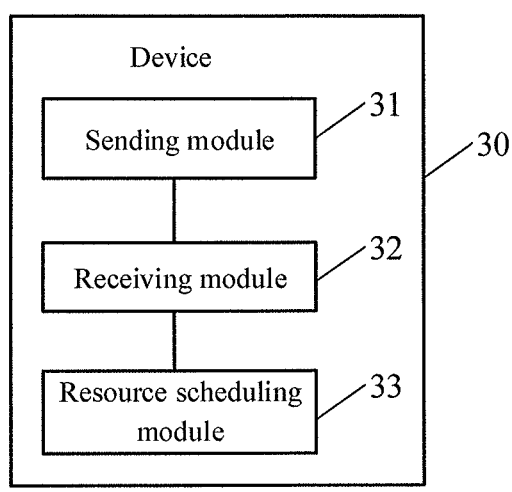
FIG. 20 is a schematic block diagram of a device according to another embodiment of the disclosure.

A device according to another embodiment of the disclosure will be described below in combination with FIG. 20 in detail. As shown in FIG. 20, the device 30 includes:

a sending module 31, configured to send cell-level resource pool information to a first-type terminal device and a second-type terminal device, wherein the device communicates with the first-type terminal device through a first-type interface, the device communicates with the second-type terminal device through the first-type interface, and the first-type terminal device communicates with the second-type terminal device through a second-type interface;

a receiving module 32, configured to receive a resource scheduling request sent by the first-type terminal device; and a resource scheduling module 33, configured to determine resource grant information according to the resource scheduling request, the sending module 31 being further configured to send the resource grant information to the first-type terminal device for the first-type terminal device to determine link resources configured for communication with other first-type terminal device according to the resource grant information.

In such a manner, the device according to the embodiment of the disclosure may send the cell-level resource pool information to the second-type terminal device, and the second-type terminal device has a resource scheduling function. Then, when the terminal device is located within coverage of the base station, scheduling may be performed for the terminal device through the base station, and when the terminal device is located in a scenario with partial coverage of the base station or without the coverage of the base station, a sending resource of a terminal may be dynamically scheduled through the second-type terminal device. Therefore, a transmission success rate may be increased, a transmission delay may be reduced, and performance and reliability of a V2V system may be ensured.

In the embodiment of the disclosure, optionally, the receiving module 32 is further configured to:

receive configuration information sent by the second-type terminal device, the configuration information indicating a related configuration of the second-type terminal device, for the device to perform scheduling for the first-type terminal device according to the configuration information.

In the embodiment of the disclosure, optionally, the configuration information includes any one of the following information: terminal-level resource pool information, location information of the second-type terminal device and signal coverage capability information of the second-type terminal.

In the embodiment of the disclosure, optionally, the first-type interface is a Uu interface, and/or, the second-type interface is a V2V interface or a V2I interface.

In the embodiment of the disclosure, optionally, the device is a base station, and/or, the first-type terminal device is an OBU, and/or the second-type terminal device is an RSU.

Figure 21:
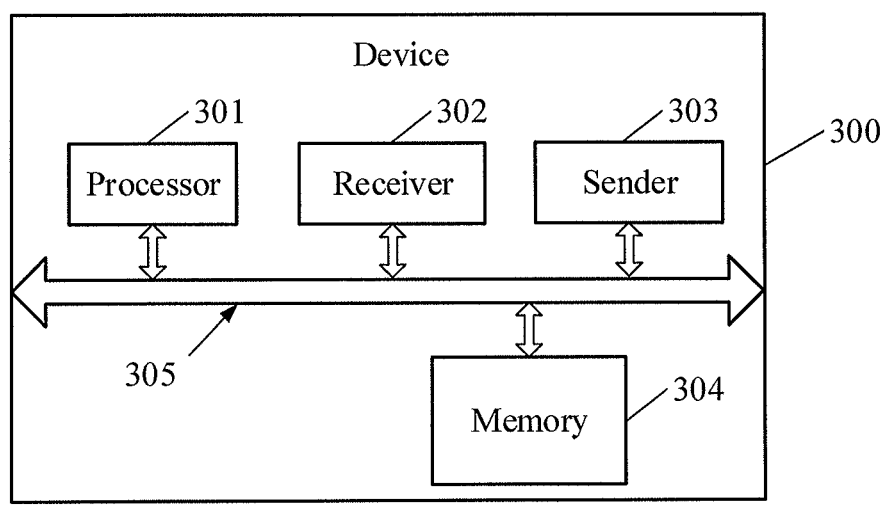
FIG. 21 is a schematic block diagram of a device according to another embodiment of the disclosure.

It is important to note that, in the embodiment of the disclosure, the sending module 31 may be implemented by a sender, the receiving module 32 may be implemented by a receiver, and the resource scheduling module 33 may be implemented by a processor 301. As shown in FIG. 21, a device 300 may include a processor 301, a receiver 302, a sender 303 and a memory 304, wherein the memory 304 may be configured to store codes executed by the processor 301 and the like.

Each component in the device 300 is coupled together through a bus system 305, wherein the bus system 305 includes a data bus, and further includes a power bus, a control bus and a state signal bus.

The device 30 shown in FIG. 20 or the device 300 shown in FIG. 21 may implement each process implemented in the method embodiment of FIG. 12, which will not be elaborated for avoiding repetitions.

An embodiment of the disclosure further provides a radio resource scheduling system, which includes the device 10 shown in any one of FIG. 13 to FIG. 15, the device 20 shown in FIG. 17 or FIG. 18 and the device 30 shown in FIG. 20.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solution. Those skilled in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiment for convenient and brief description and will not be elaborated herein.

In some embodiments provided by the disclosure, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer device (which may be a personal computer, a server, network device or the like) to execute all or part of the steps of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A radio resource scheduling method, comprising:
   receiving, by a first-type terminal device, cell-level resource pool information sent by a base station; and
   receiving, by the first-type terminal device, terminal-level resource pool information sent by a second-type terminal device;
   determining, by the first-type terminal device, whether to send resource scheduling request information to at least one of a base station or a second-type terminal device, wherein the first-type terminal device communicates with the base station through a first-type interface, the first-type terminal device communicates with the second-type terminal device through a second-type interface, the second-type terminal device communicates with the base station through the first-type interface, and the second-type terminal device has a resource scheduling function; and
   according to a result of the determination, determining, by the first-type terminal device, link resources configured for communication with another first-type terminal device.

2. The method according to claim 1,
   wherein according to a result of the determination, determining, by the first-type terminal device, the link resources configured for communication with the other first-type terminal device comprises:
   when it is determined to send the resource scheduling request information to the base station,
      sending first resource scheduling request information to the base station; when resource grant information sent by the base station is received, determining resources indicated by the resource grant information sent by the base station to be the link resources; or, when the resource grant information sent by the base station is not received, determining whether to send the resource scheduling request information to at least one of the base station or the second-type terminal device; or
   when it is determined not to send the resource scheduling request information to the base station or the second-type terminal device, determining the link resources according to at least one of the cell-level resource pool information or the terminal-level resource pool information.

3. The method according to claim 1, wherein determining, by the first-type terminal device, the link resources configured for communication with the other first-type terminal device according to the determined result comprises:
when a resource scheduling request is determined to be sent to the second-type terminal device, sending second resource scheduling request information to the second-type terminal device; or,
when effective resource grant information sent by the second-type terminal device is received, determining resources indicated by the resource grant information sent by the second-type terminal device to be the link resources; and
when the effective resource grant information sent by the second-type terminal device is not received, determining whether to send the resource scheduling request to at least one of the base station or the second-type terminal device, and
when the resource scheduling request is determined not to be sent to the base station and the second-type terminal device, determining the link resources according to at least one of the cell-level resource pool information or the terminal-level resource pool information.

4. The method according to claim 1, wherein according to a result of the determination, determining, by the first-type terminal device, the link resources configured for communication with the other first-type terminal device comprises:
when it is determined to send the resource scheduling request information to the base station and the second-type terminal device,
sending third resource scheduling request information to the base station and sending fourth resource scheduling request information to the second-type terminal device;
receiving resource grant information sent for the third resource scheduling request information by the base station;
receiving resource grant information sent for the fourth resource scheduling request information by the second-type terminal device; and
determining the link resources according to the resource grant information for the third resource scheduling request information and the resource grant information for the fourth resource scheduling request information.

5. The method according to claim 2, wherein determining the link resources according to the cell-level resource pool information and the terminal-level resource pool information comprises:
autonomously selecting a resource pool to be preferably adopted according to the cell-level resource pool information and the terminal-level resource pool information, and
determining the link resources from the resource pool to be preferably adopted; or,
selecting the resource pool to be preferably adopted according to a configuration of the base station, and determining the link resources from the resource pool to be preferably adopted.

6. The method according to claim 5, wherein autonomously selecting the resource pool to be preferably adopted and determining the link resources from the resource pool to be preferably adopted comprises:

when it is determined that the terminal-level resource pool information is effective, determining part of or all resources in resources indicated by the terminal-level resource pool information to be the link resources; or,
when it is determined that the terminal-level resource pool information is ineffective and the cell-level resource pool information is effective, determining part of or all resources in resources indicated by the cell-level resource pool information to be the link resources; or,
when it is determined that the terminal-level resource pool information is ineffective and the cell-level resource pool information is ineffective, determining part or all of resources in a preconfigured resource pool to be the link resources.

7. The method according to claim 5, wherein autonomously selecting the resource pool to be preferably adopted and determining the link resources from the resource pool to be preferably adopted comprises:
when it is determined that the terminal-level resource pool information is ineffective, determining part or all of resources in a common part of the resources indicated by the terminal-level resource pool information and the resources indicated by the cell-level resource pool information to be the link resources.

8. The method according to claim 1, wherein determining, by the first-type terminal device, whether to send the resource scheduling request information to at least one of the base station or the second-type terminal device comprises:
determining, by the first-type terminal device, whether to send the resource scheduling request information to at least one of the base station or the second-type terminal device according to at least one of the following information: whether the first-type terminal device is located within coverage of at least one of the base station or the second-type terminal device and has an effective connection, a movement velocity of the first-type terminal device, a signal coverage condition of the base station and a signal coverage condition of the second-type terminal device.

9. A radio resource scheduling method, comprising:
determining, by a second-type terminal device, whether cell-level resource pool information sent by a base station is received;
receiving, by the second-type terminal device, resource scheduling request information sent by a first-type terminal device, wherein the second-type terminal device communicates with the base station through a first-type interface, the first-type terminal device communicates with the base station through the first-type interface, and the second-type terminal device communicates with the first-type terminal device through a second-type interface; and
sending, by the second-type terminal device, resource grant information to the first-type terminal device for the first-type terminal device to determine link resources configured for communication with other first-type terminal device according to the resource grant information;
wherein sending, by the second-type terminal device, the resource grant information to the first-type terminal device comprises:
when it is determined that the cell-level resource pool information sent by the base station is received, sending terminal-level resource pool information to the first-type terminal device according to the cell-level resource pool information, determining the resource grant information according to the resource scheduling request information, the cell-level resource pool information and the terminal-level resource pool information, and sending the resource grant information to the first-type terminal device; or when it is determined that the cell-level resource pool information sent by the base station is not received, sending the terminal-level resource pool information to the first-type terminal device according to a preconfigured resource pool, determining the resource grant information according to the resource scheduling request information, the preconfigured resource pool and the terminal-level resource pool information; and sending the resource grant information to the first-type terminal device.

10. The method according to claim 9, wherein sending the terminal-level resource pool information to the first-type terminal device according to the cell-level resource pool information when it is determined that the cell-level resource pool information sent by the base station is received comprises:

determining part of resources in resources indicated by the cell-level resource pool information to form a terminal-level resource pool, and sending the terminal-level resource pool information indicating the terminal-level resource pool to the first-type terminal device.

11. The method according to claim 10, further comprising:

sending, by the second-type terminal device, configuration information to the base station, the configuration information indicating a related configuration of the second-type terminal device, for the base station to perform scheduling for the first-type terminal device according to the configuration information.

12. The method according to claim 11, wherein the configuration information comprises any one of the following information: the terminal-level resource pool information, location information of the second-type terminal device and signal coverage capability information of the second-type terminal device.

13. The method according to claim 9, wherein when it is determined that the cell-level resource pool information sent by the base station is not received, sending the terminal-level resource pool information to the first-type terminal device according to the preconfigured resource pool comprises:

determining part of resources in the preconfigured resource pool to form the terminal-level resource pool; and sending the terminal-level resource pool information indicating the terminal-level resource pool to the first-type terminal device.

14. A device, comprising:

a receiver, configured to receive resource scheduling request information sent by a first-type terminal device, wherein the device communicates with a base station through a first-type interface, the first-type terminal device communicates with the base station through the first-type interface, and the device communicates with the first-type terminal device through a second-type interface;

a sender, configured to send resource grant information to the first-type terminal device for the first-type terminal device to determine link resources configured for communication with other first-type terminal device according to the resource grant information; and a processor, configured to determine whether the sender receives cell-level resource pool information sent by the base station, wherein the sender is configured to: when the processor determines that the sender receives the cell-level resource pool information sent by the base station, send terminal-level resource pool information to the first-type terminal device according to the cell-level resource pool information; or when the processor determines that the sender does not receive the cell-level resource pool information sent by the base station, send the terminal-level resource pool information to the first-type terminal device according to a preconfigured resource pool;

the processor is further configured to determine the resource grant information according to the resource scheduling request information, the cell-level resource pool information and the terminal-level resource pool information; or determine the resource grant information according to the resource scheduling request information, the preconfigured resource pool and the terminal-level resource pool information; and the sender is further configured to send the resource grant information to the first-type terminal device.

15. The device according to claim 14, wherein the processor is specifically configured to:

determine part of resources in resources indicated by the cell-level resource pool information to form a terminal-level resource pool, or determine part of resources in the preconfigured resource pool to form the terminal-level resource pool, and wherein the sender is specifically configured to:

send the terminal-level resource pool information indicating the terminal-level resource pool to the first-type terminal device.

16. The device according to claim 15, wherein the sender is further configured to:

send configuration information to the base station, the configuration information indicating a related configuration of the device, for the base station to perform scheduling for the first-type terminal device according to the configuration information, wherein the configuration information comprises any one of the following information: the terminal-level resource pool information, location information of the device and signal coverage capability information of the device.

* * * * *